(12) United States Patent
Park et al.

(10) Patent No.: US 10,291,441 B2
(45) Date of Patent: May 14, 2019

(54) METHOD FOR CONSTRUCTING CODEBOOK IN MULTIPLE-ANTENNA WIRELESS COMMUNICATION SYSTEM, AND APPARATUS THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Junyeub Suh, Seoul (KR); Wonjin Sung, Seoul (KR); Kijun Kim, Seoul (KR)

(73) Assignees: LG ELECTRONICS INC., Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 0 days.

(21) Appl. No.: 15/753,665

(22) PCT Filed: Aug. 17, 2016

(86) PCT No.: PCT/KR2016/009032
§ 371 (c)(1),
(2) Date: Feb. 20, 2018

(87) PCT Pub. No.: WO2017/030363
PCT Pub. Date: Feb. 23, 2017

(65) Prior Publication Data
US 2018/0248720 A1    Aug. 30, 2018

Related U.S. Application Data

(60) Provisional application No. 62/206,311, filed on Aug. 18, 2015.

(51) Int. Cl.
*H04L 25/03* (2006.01)
*H04B 7/0456* (2017.01)
(Continued)

(52) U.S. Cl.
CPC ..... *H04L 25/03929* (2013.01); *H04B 7/0473* (2013.01); *H04B 7/0626* (2013.01);
(Continued)

(58) Field of Classification Search
CPC ........ H04L 25/03929; H04L 25/03923; H04B 7/0473; H04B 7/0626; H04B 7/0634; H04B 7/0663; H04B 7/0639; H04W 84/045
See application file for complete search history.

(56) References Cited

U.S. PATENT DOCUMENTS

| | | | | |
|---|---|---|---|---|
| 2012/0039251 A1* | 2/2012 | Sayana | ................. | H04B 7/0639 370/328 |
| 2012/0314792 A1* | 12/2012 | Tesanovic | ............ | H04B 7/0639 375/267 |

(Continued)

FOREIGN PATENT DOCUMENTS

WO   WO 2015/037936 A1   3/2015

OTHER PUBLICATIONS

Catt, "Codebook structure for FD-MIMO", 3GPP TSG RAN WG1 Meeting #82, R1-153939, Aug. 24-28, 2015, pp. 1-6.

*Primary Examiner* — Syed Haider
(74) *Attorney, Agent, or Firm* — Birch, Stewart, Kolasch & Birch, LLP

(57) ABSTRACT

A method for constructing a codebook in a multiple-antenna wireless communication system and an apparatus therefor are disclosed. Specifically, constructing a codebook in a multiple-antenna wireless communication system comprises the steps of: receiving parameters for constructing a codebook from a base station; and constructing a codebook using the parameters for constructing the codebook, wherein the parameters for constructing the codebook may include a phase value ($\alpha$) of a first code vector forming the codebook, a phase difference ($\beta$) between code vectors that are adjacent (Continued)

to one another within the codebook, and the number of bits ($\gamma$) that is required when feeding back a code vector selected thin the codebook.

6 Claims, 18 Drawing Sheets

(51) Int. Cl.
 *H04B 7/06* (2006.01)
 *H04W 84/04* (2009.01)
(52) U.S. Cl.
 CPC ......... *H04B 7/0634* (2013.01); *H04B 7/0639* (2013.01); *H04B 7/0663* (2013.01); *H04L 25/03923* (2013.01); *H04W 84/045* (2013.01)

(56) References Cited

U.S. PATENT DOCUMENTS

| | | | |
|---|---|---|---|
| 2013/0107915 A1* | 5/2013 | Benjebbour | H04B 7/0486 375/219 |
| 2014/0029684 A1 | 1/2014 | Shirani-Mehr et al. | |
| 2015/0036761 A1 | 2/2015 | Gaal et al. | |
| 2015/0117561 A1 | 4/2015 | Benjebbour et al. | |
| 2016/0065292 A1* | 3/2016 | Liu | H04B 7/0626 375/267 |

* cited by examiner

【FIG. 1】
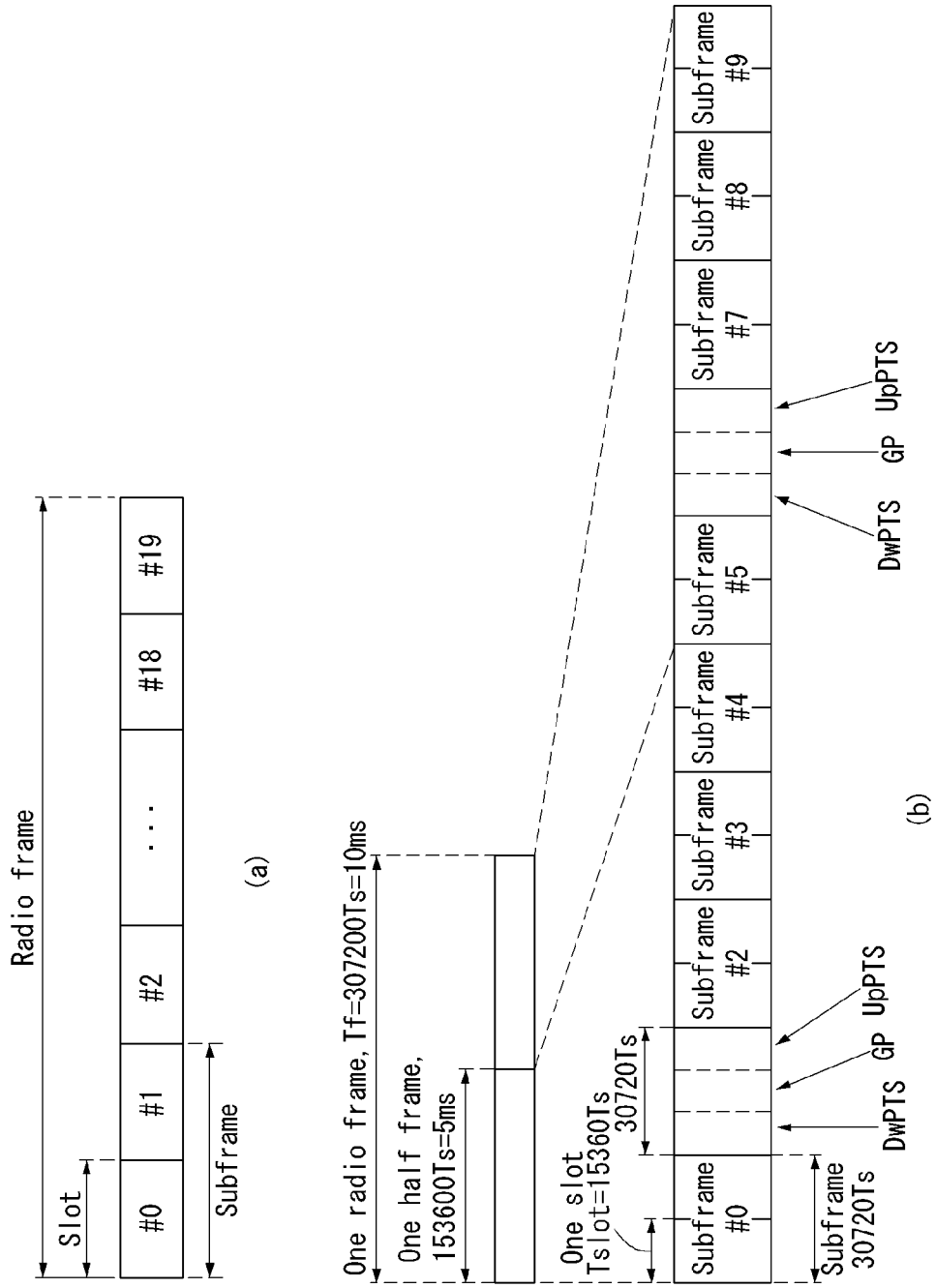

[FIG. 2]
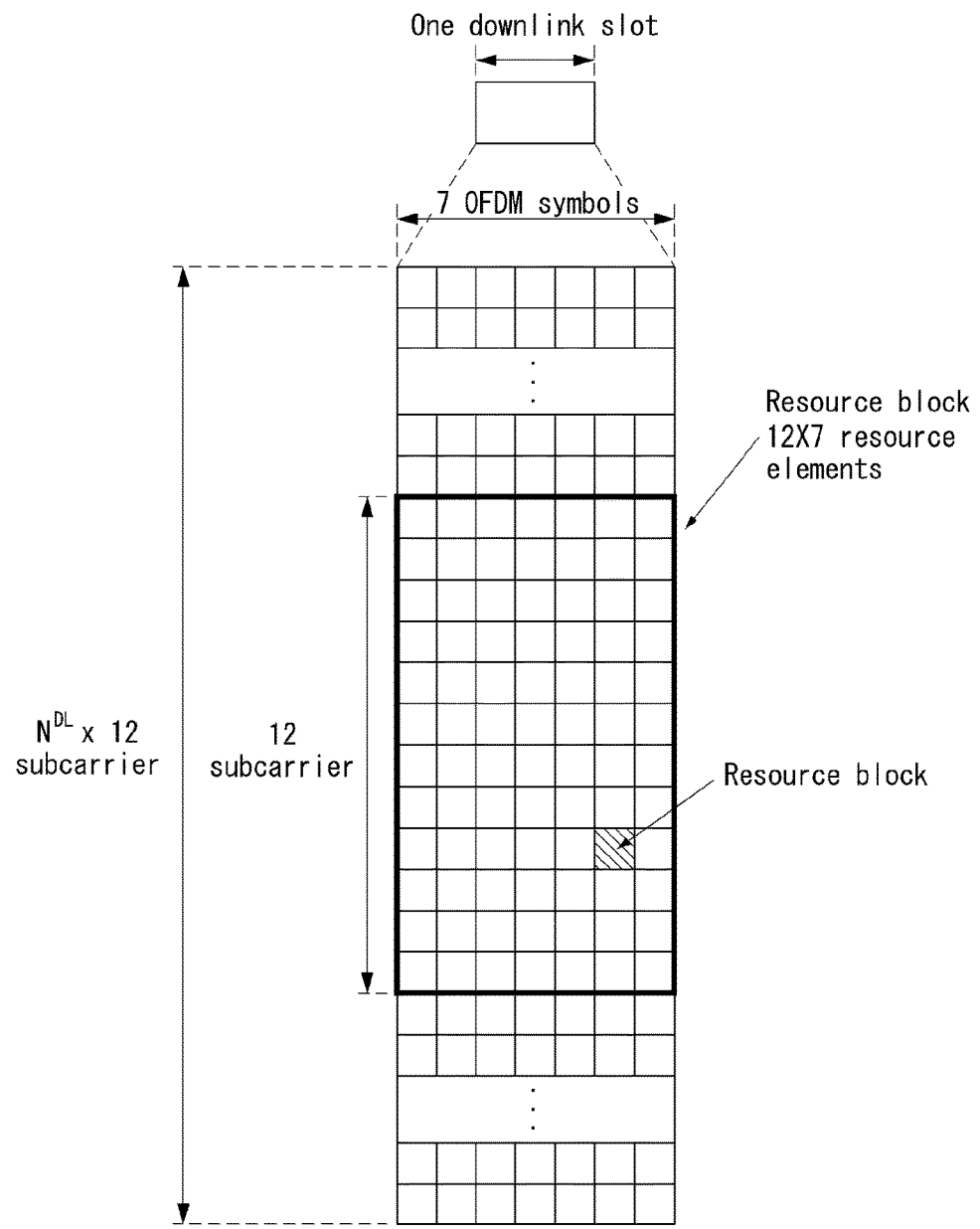

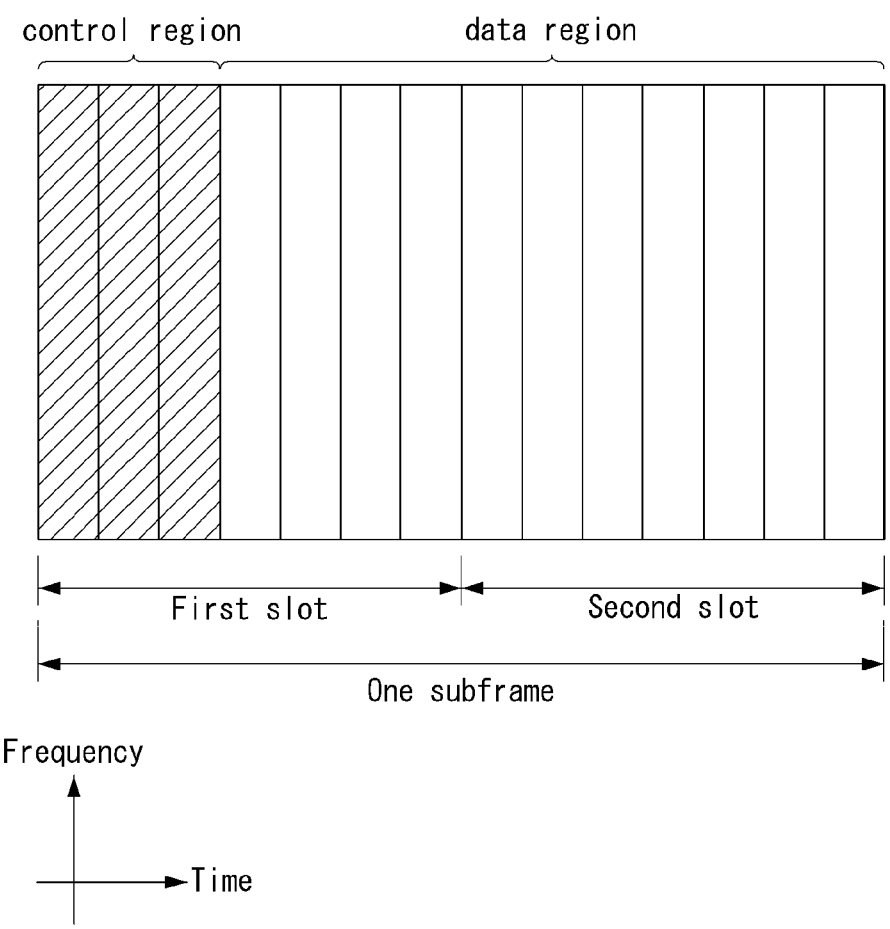

[FIG. 4]
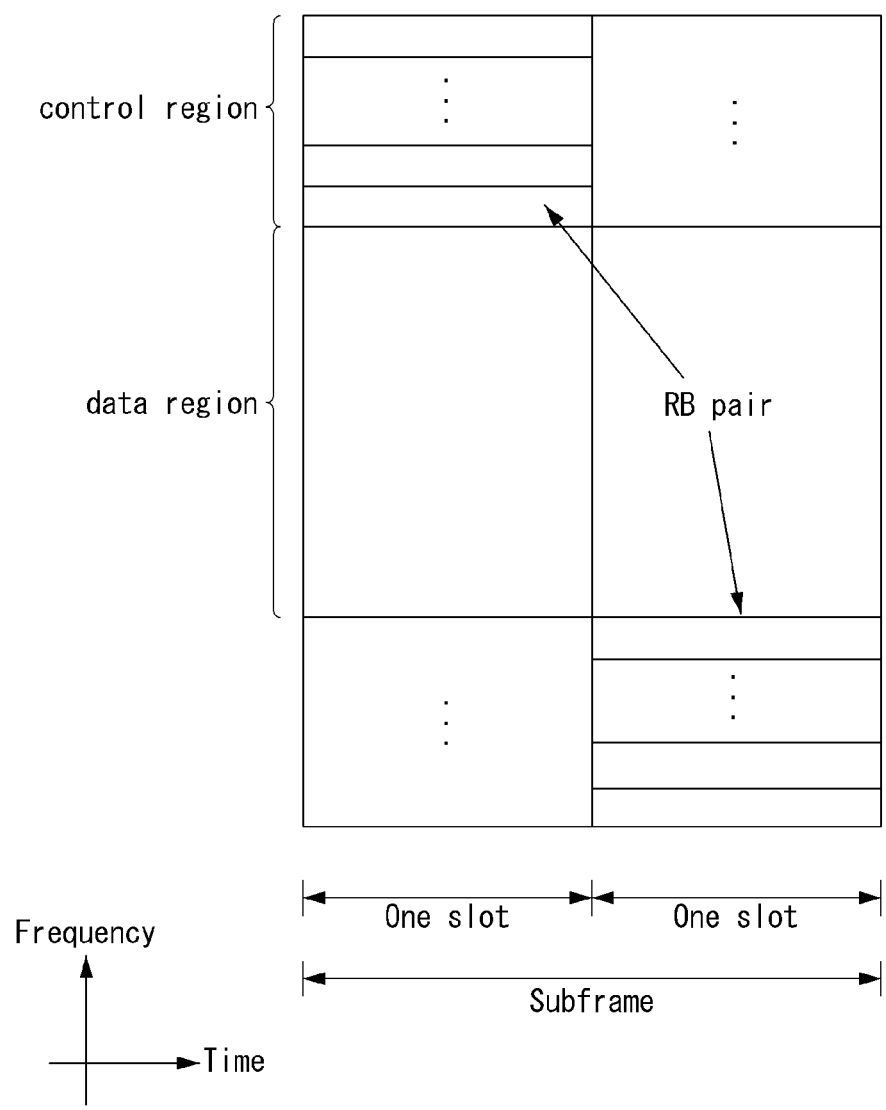

[FIG. 5]
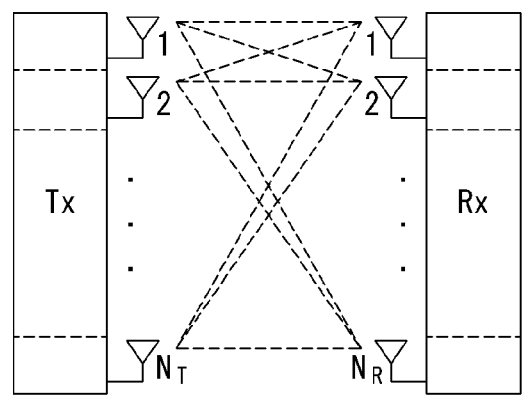
[FIG. 6]
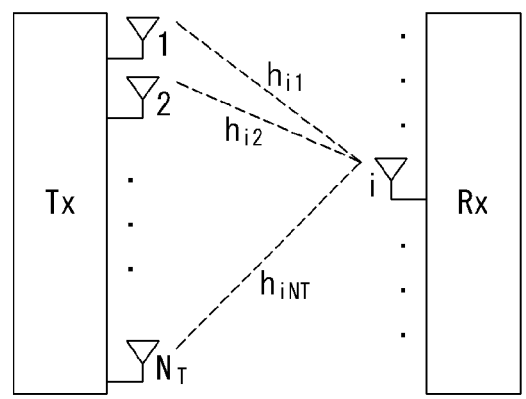

[FIG. 7]
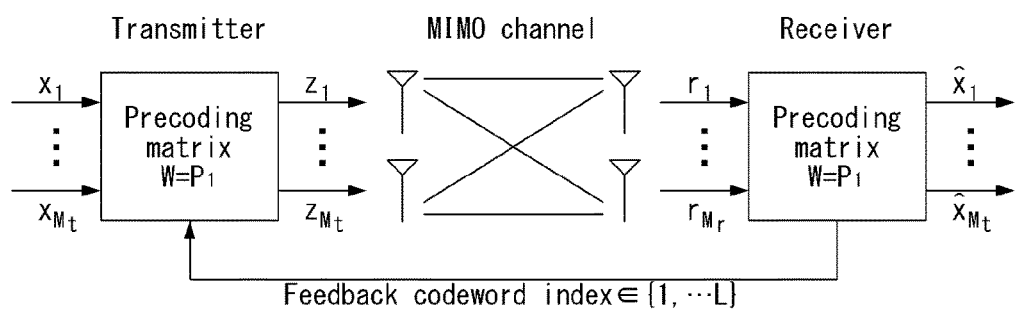

[FIG. 8]
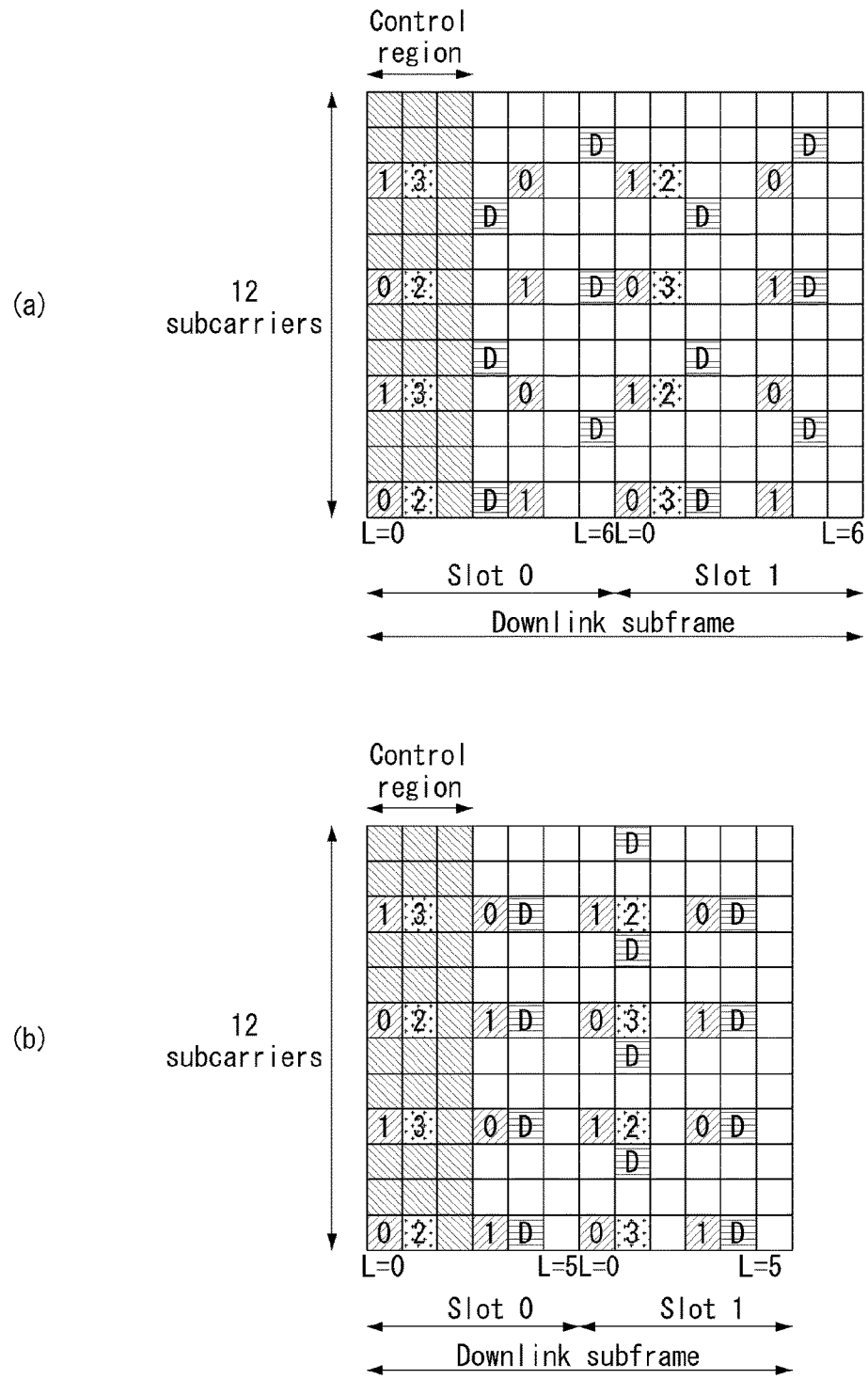

【FIG. 9】
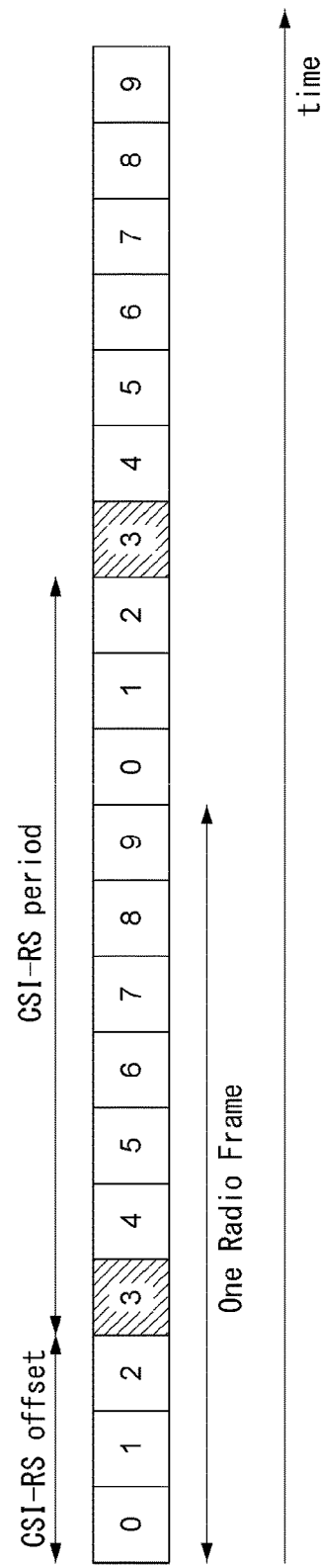

[FIG. 10]
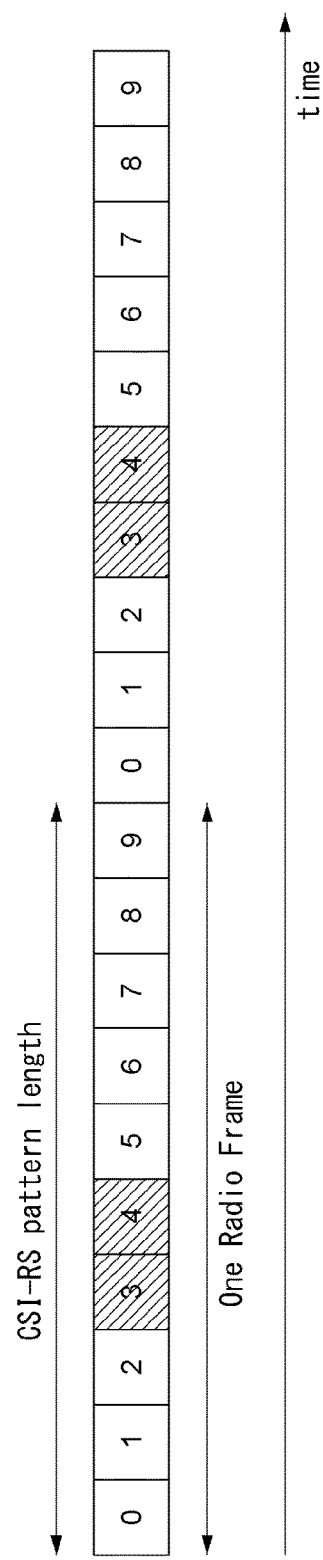

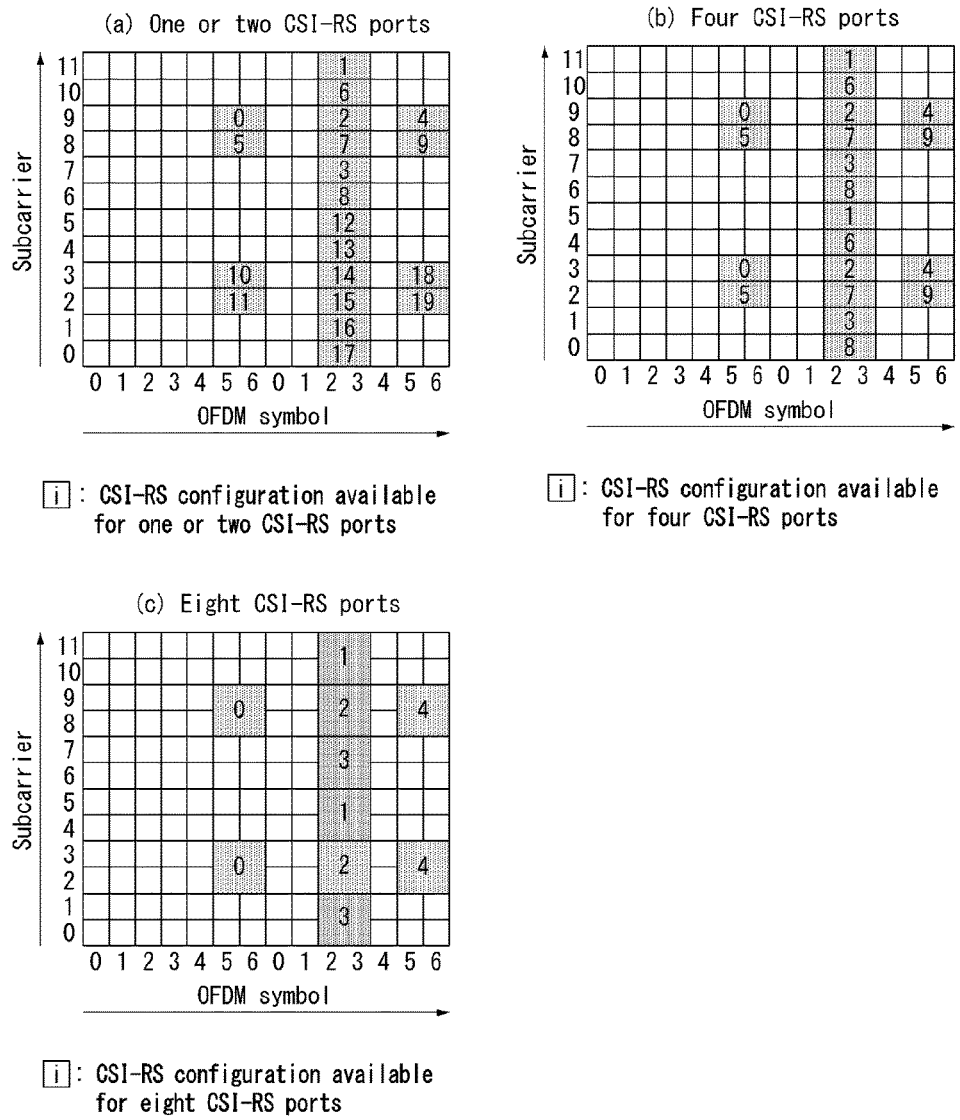
[FIG. 11]

【FIG. 12】
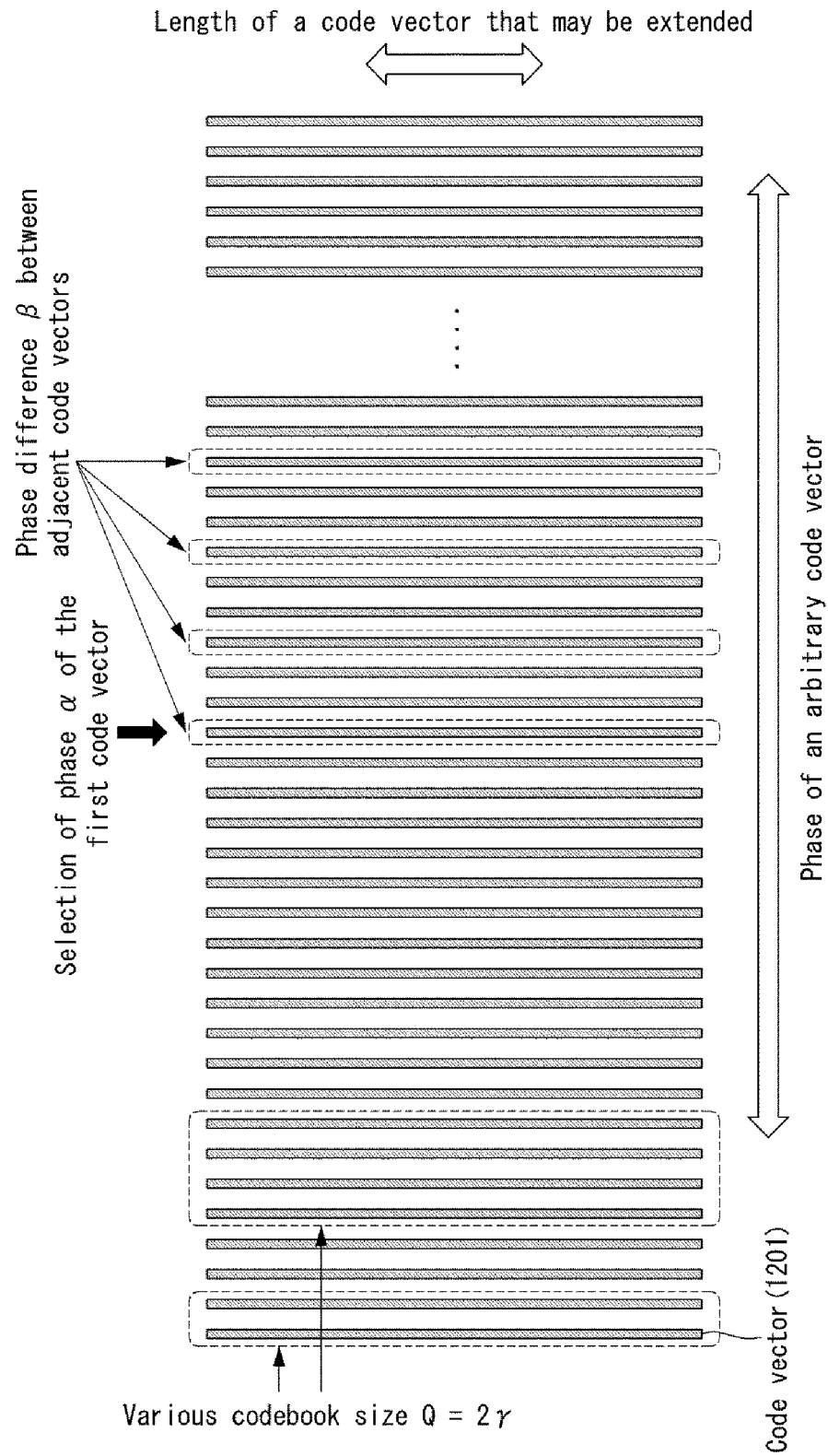

[FIG. 13]
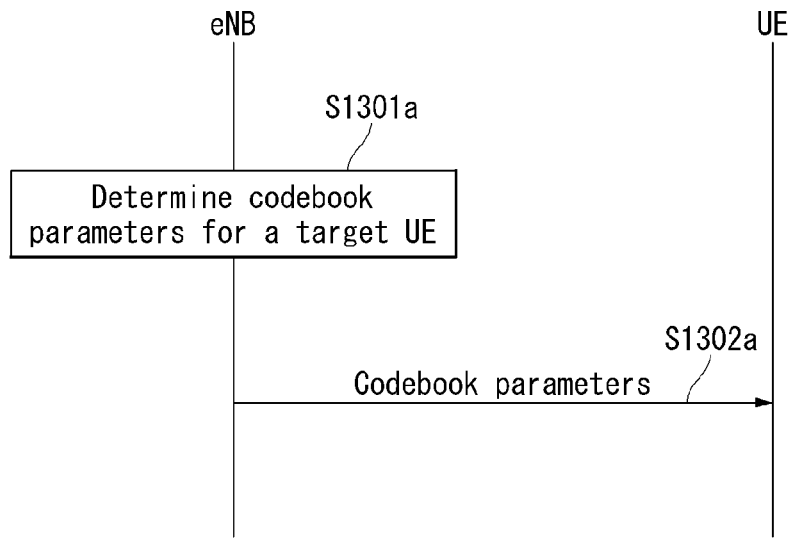
(a)
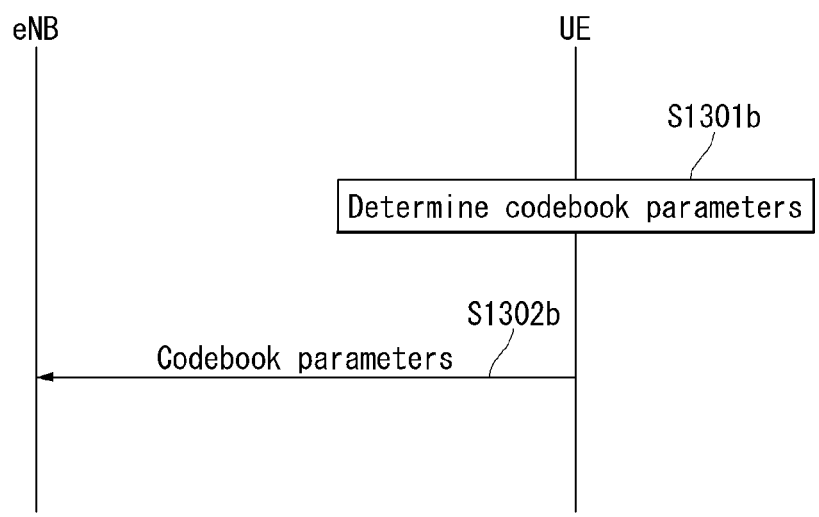
(b)

[FIG. 14]
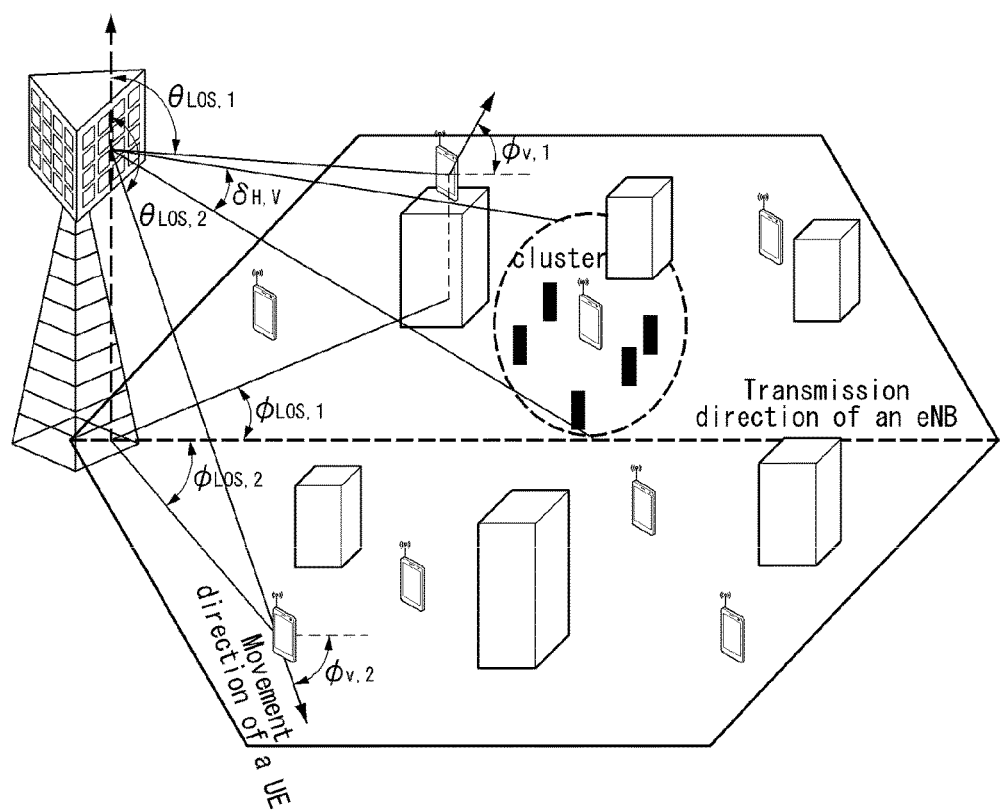

[FIG. 15]
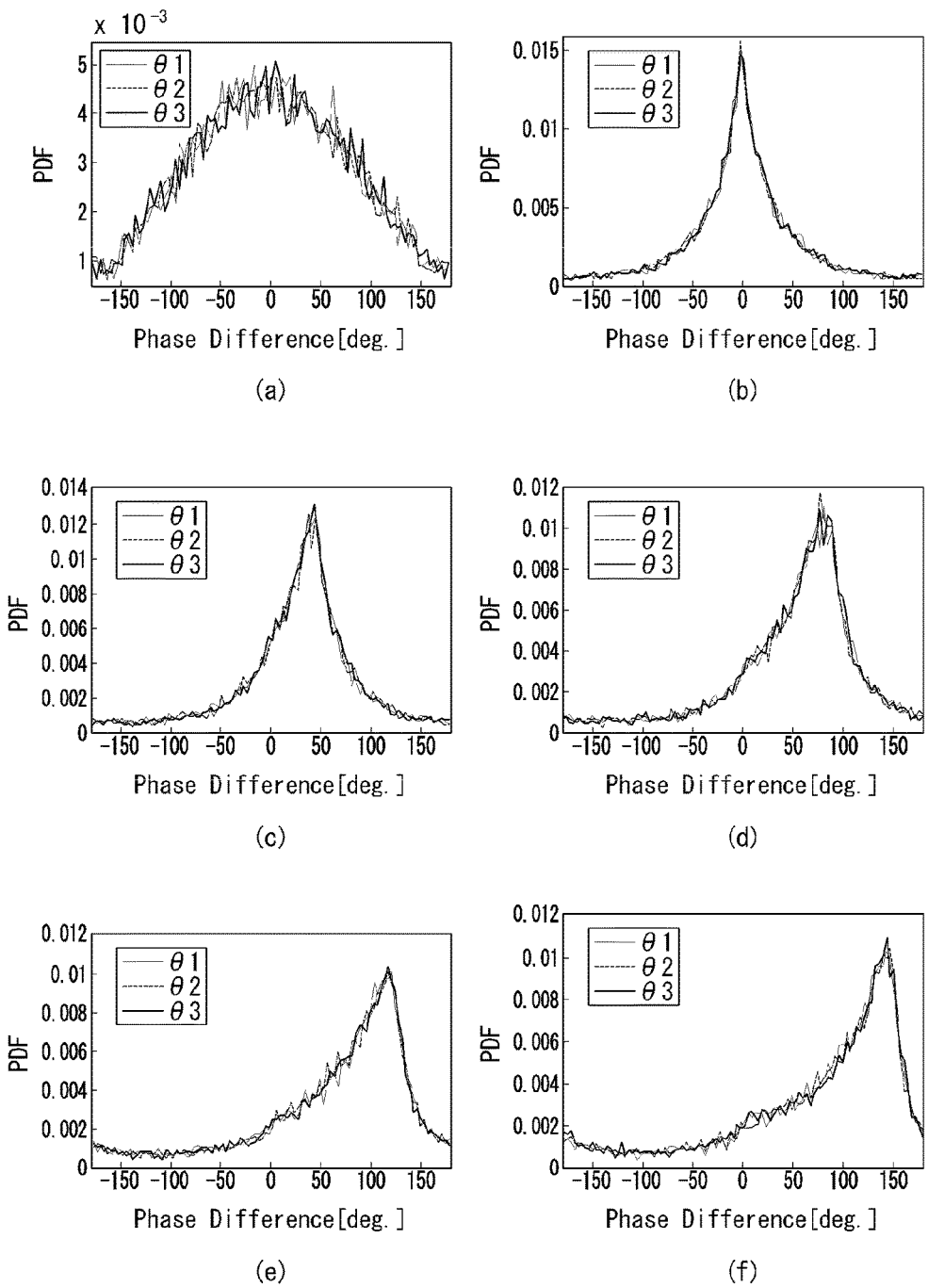

【FIG. 16】
(a)
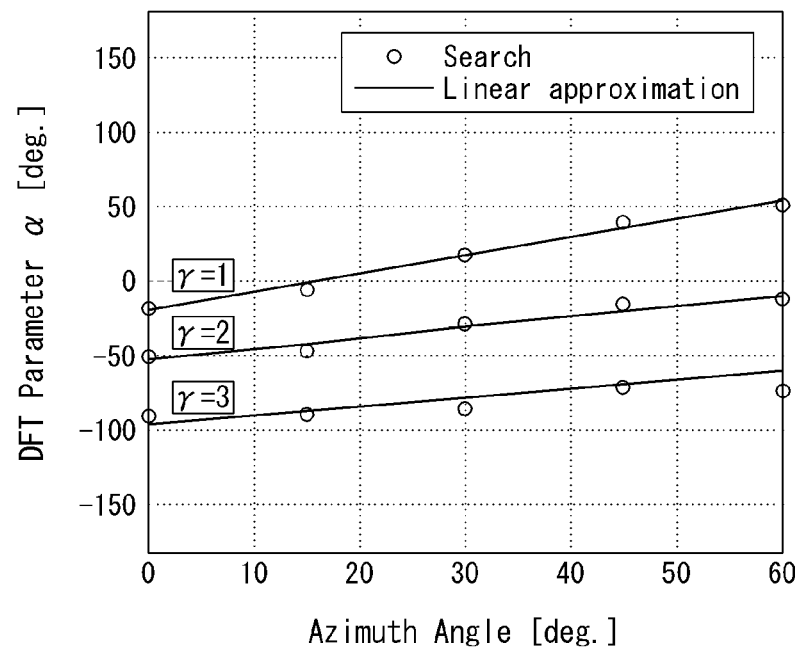
(b)
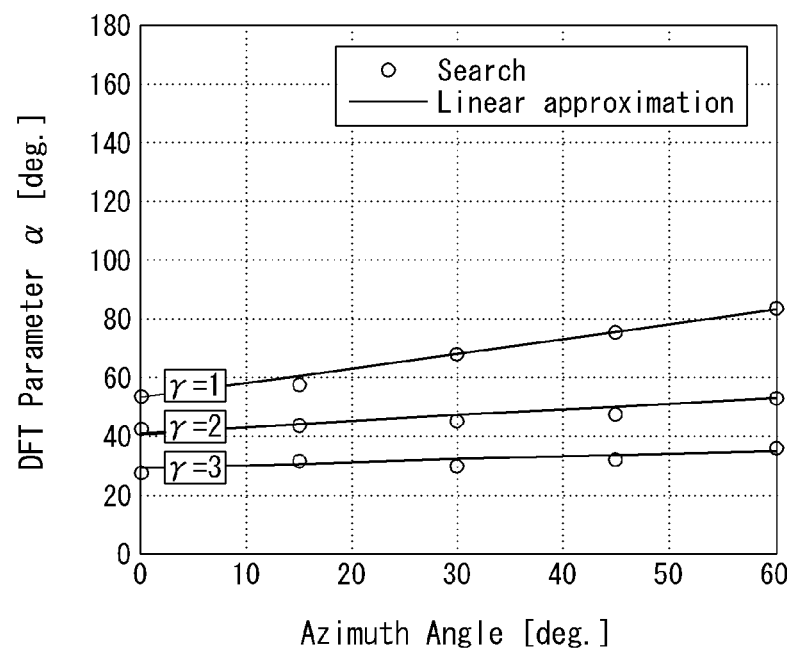

【FIG. 17】
(a)
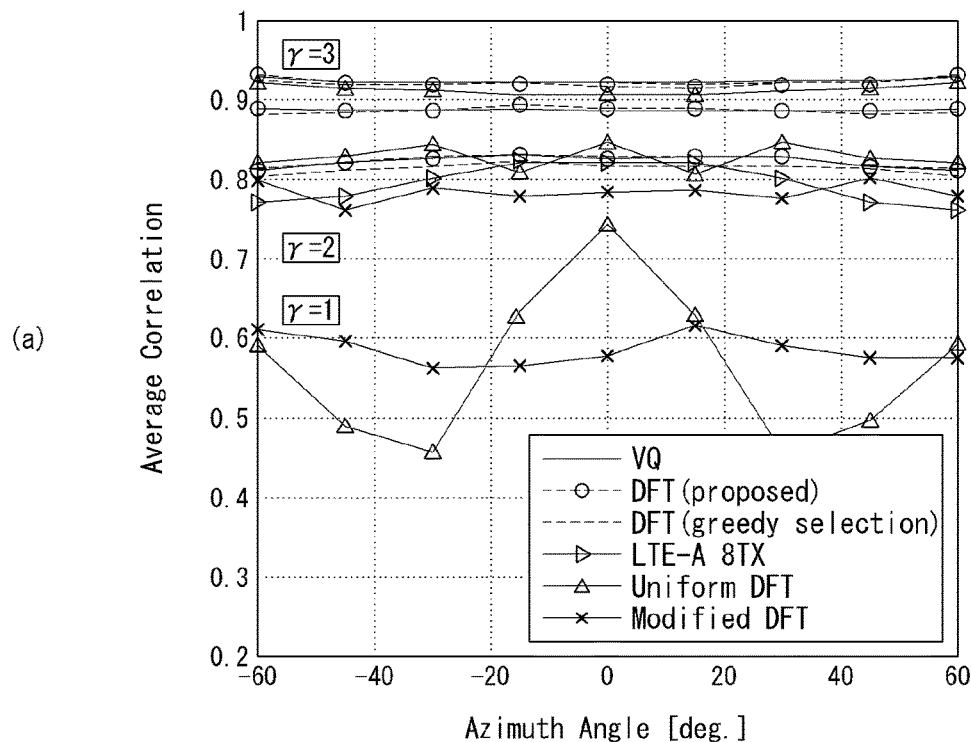
(b)
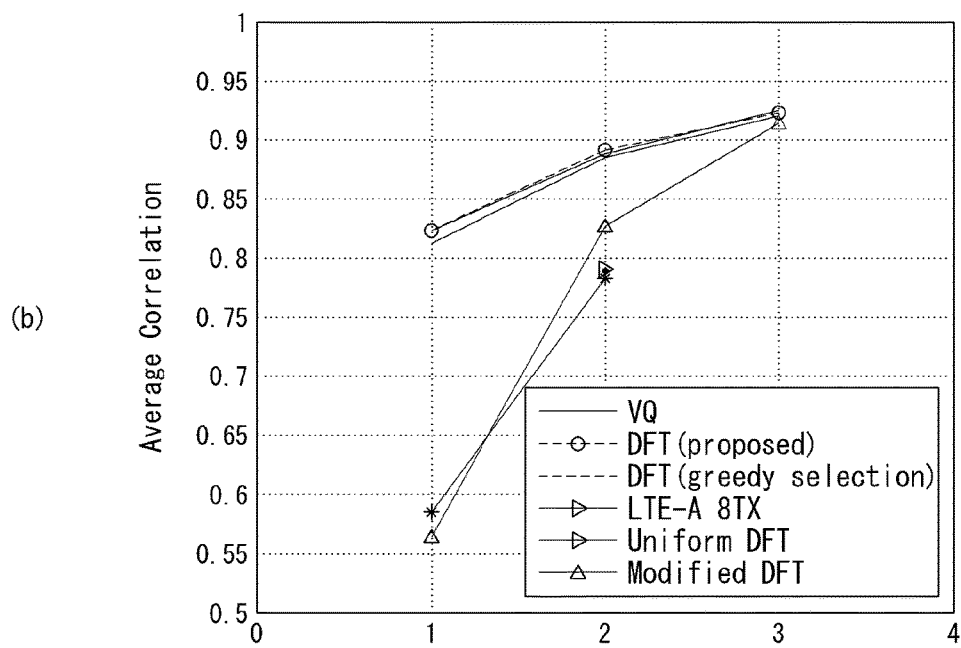

[FIG. 18]
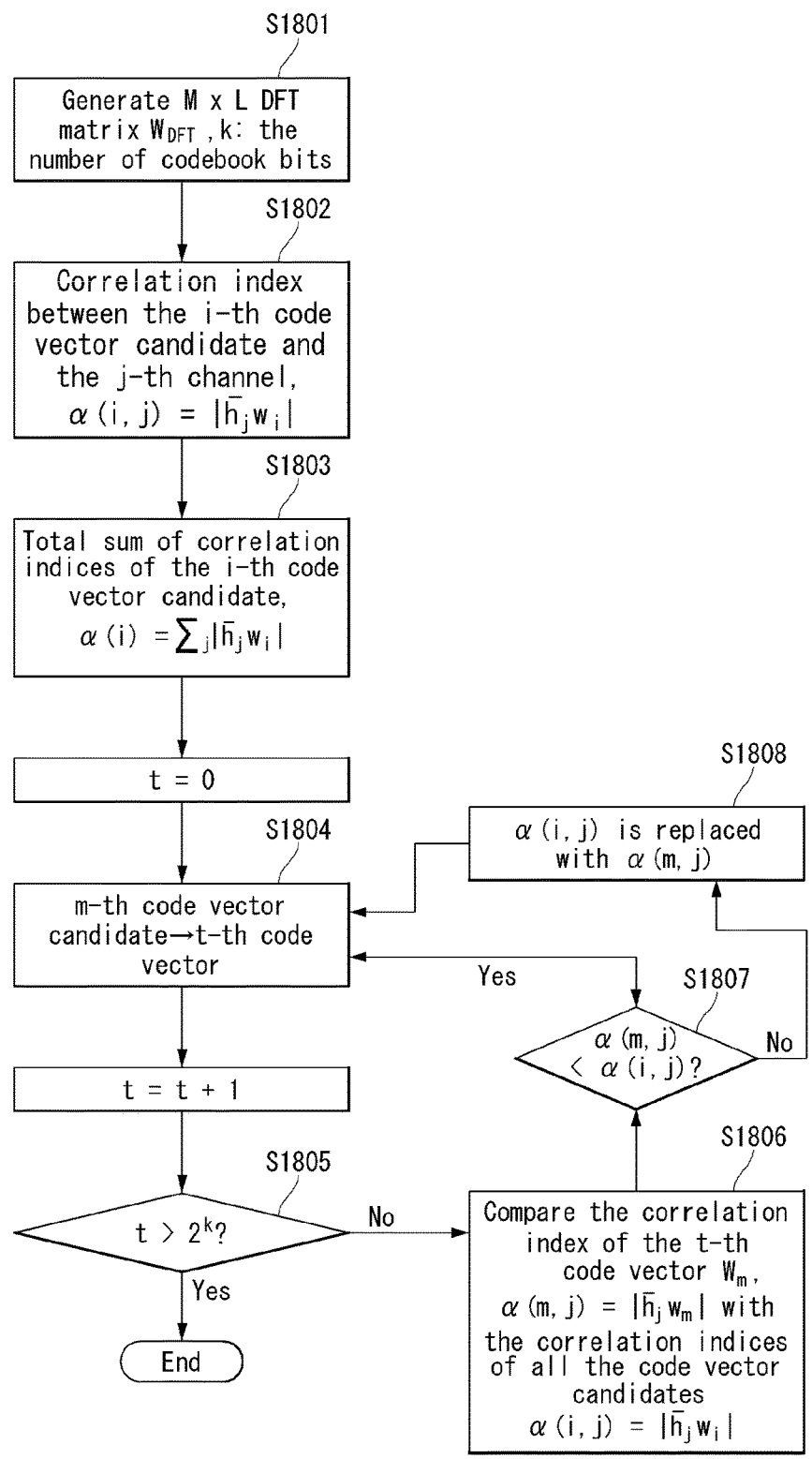

[FIG. 19]
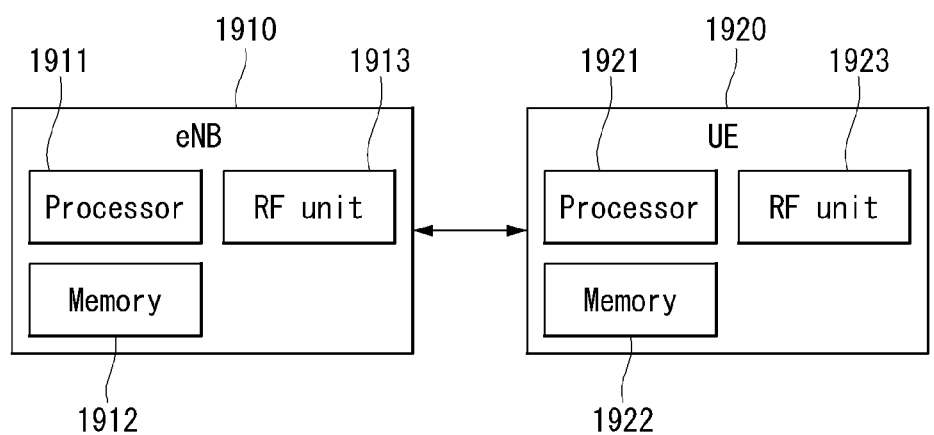

METHOD FOR CONSTRUCTING CODEBOOK IN MULTIPLE-ANTENNA WIRELESS COMMUNICATION SYSTEM, AND APPARATUS THEREFOR

CROSS REFERENCE TO RELATED APPLICATIONS

This application is the National Phase of PCT International Application No. PCT/KR2016/009032, filed on Aug. 17, 2016, which claims priority under 35 U.S.C. 119(e) to U.S. Provisional Application No. 62/206,311, filed on Aug. 18, 2015, all of which are hereby expressly incorporated by reference into the present application.

TECHNICAL FIELD

The present invention relates to a mobile terminal. More specifically, the present invention relates to a method for constructing a codebook in a wireless communication system supporting a MIMO (Multi-Input Multi-Output) system and an apparatus supporting the method.

BACKGROUND ART

Mobile communication systems have been developed to provide voice services while ensuring activities of users. However, mobile communication systems have evolved to support data services beyond the voice services. Nowadays since a shortage of resources is caused due to explosive increase of traffic and users require services at a much higher speed, more advanced mobile communication systems are demanded.

The next-generation mobile communication systems are largely required to support accommodation of explosive data traffic, considerable increase of data rate per user, accommodation of a significantly increased number of connected devices, very low end-to-end latency, and high energy efficiency. To this purpose, research on various technologies is being conducted, such as dual connectivity, massive MIMO, in-band full duplex, NOMA (Non-Orthogonal Multiple Access), super wideband, and device networking.

DISCLOSURE

Technical Problem

An object of the present invention is to provide a method for constructing a codebook adaptively according to a channel condition in a wireless communication system supporting MIMO (Multi-Input Multi-Output).

Technical objects to be achieved by the present invention are not limited to those described above, and other technical objects not mentioned above may also be clearly understood from the descriptions given below by those skilled in the art to which the present invention belongs.

Technical Solution

According to one aspect of the present invention, a method for constructing, by a user equipment (UE), a codebook in a multiple-antenna wireless communication system includes receiving parameters for constructing a codebook from a base station; and constructing a codebook by using the parameters for constructing the codebook, wherein the parameters for constructing the codebook include a phase value ($\alpha$) of a first code vector forming the codebook, a phase difference ($\beta$) between code vectors adjacent to each other within the codebook, and the number of bits ($\gamma$) required when feeding back a code vector selected in the codebook.

According to another aspect of the present invention, a user equipment (UE) constructing a codebook in a multiple-antenna wireless communication system includes an RF (Radio Frequency) unit transmitting and receiving a radio signal and a processor controlling the RF unit, wherein the processor is configured to receive parameters for constructing a codebook from a base station and to construct a codebook by using the parameters for constructing the codebook, wherein the parameters for constructing the codebook include a phase value ($\alpha$) of a first code vector forming the codebook, a phase difference ($\beta$) between code vectors adjacent to each other within the codebook, and the number of bits ($\gamma$) required when feeding back a code vector selected in the codebook.

Preferably, the codebook may be constructed by using a mathematical equation below.

$$W[N \times M] = \frac{1}{\sqrt{N}} \begin{bmatrix} 1 & 1 & 1 & \cdots & 1 \\ e^{j\alpha} & e^{j(\alpha+\beta)} & e^{j(\alpha+2\beta)} & \cdots & e^{j(\alpha+(M-1)\beta)} \\ e^{2j\alpha} & e^{2j(\alpha+\beta)} & e^{2j(\alpha+2\beta)} & \cdots & e^{2j(\alpha+(M-1)\beta)} \\ \vdots & \vdots & \vdots & \ddots & \vdots \\ e^{(N-1)j\alpha} & e^{(N-1)j(\alpha+\beta)} & e^{(N-1)j(\alpha+2\beta)} & \cdots & e^{2j(\alpha+(M-1)\beta)} \end{bmatrix}, \quad \text{[Equation]}$$

where N represents the number of transmission antennas, and M represents the total number of code vectors forming the codebook, which may be determined by $2^{\gamma}$.

Preferably, the parameters for constructing a codebook may be determined from location information of the UE and/or incident angle information of an uplink signal transmitted from the UE.

Preferably, the parameters for constructing a codebook may be determined from a distribution of channel phase differences measured by using a CSI-RS (Channel State Information-Reference Signal) for each antenna port transmitted from the base station.

Preferably, azimuth angle of a UE, phase value of the first code vector, and phase difference between adjacent code vectors in the codebook may be proportional to each other.

Preferably, the phase value of the first code vector and the phase difference between adjacent code vectors in the codebook may be determined from the azimuth angle of the UE.

Preferably, a precoding matrix indicator (PMI) indicating a precoding matrix formed by one or more code vectors selected from the codebook may be reported to the base station.

Advantageous Effects

According to an embodiment of the present invention, a codebook appropriate for various channel conditions may be constructed.

According to an embodiment of the present invention, beamforming appropriate for specific channel characteristics may be performed by constructing a codebook by using parameters selected according to a receiving channel of a mobile terminal.

The technical effects of the present invention are not limited to the technical effects described above, and other technical effects not mentioned herein may be understood to those skilled in the art to which the present invention belongs from the description below.

DESCRIPTION OF DRAWINGS

The accompanying drawings, which are included herein as a part of detailed descriptions to help understanding the present invention, provide embodiments of the present invention and describe technical features of the present invention with detailed descriptions below.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 is a diagram for describing a basic concept of a codebook-based precoding in a wireless communication system to which the present invention may be applied.

FIG. 8 illustrates reference signal patterns mapped to downlink resource block pairs in a wireless communication system to which the present invention may be applied.

FIG. 9 illustrates a method for transmitting a CSI-RS periodically in a wireless communication system to which the present invention may be applied.

FIG. 10 illustrates a method for transmitting a non-periodic CSI-RS in a wireless communication system to which the present invention may be applied.

FIG. 11 illustrates a CSI-RS configuration in a wireless communication system to which the present invention may be applied.

FIG. 12 illustrates a parametric codebook according to one embodiment of the present invention.

FIG. 13 illustrates a method for constructing a code book according to one embodiment of the present invention.

FIG. 14 illustrates a signal transmission environment in a wireless communication system to which the present invention may be applied.

FIG. 15 illustrates a phase difference between adjacent channels according to the azimuth angle of a mobile terminal according to one embodiment of the present invention.

FIG. 16 illustrates a relationship between the azimuth angle of a mobile terminal and codebook parameters.

FIG. 17 illustrates a result of performance evaluation in terms of average correlation with respect to a codebook according to the present invention.

FIG. 18 illustrates a greedy selection algorithm.

FIG. 19 illustrates a block diagram of a wireless communication apparatus according to one embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to Which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \Lambda, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \Lambda, \hat{s}_{N_T}]^T = [P_1 s_1, P_2 s_2, \Lambda, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T 1} & w_{N_T 2} & \Lambda & w_{N_T N_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \Lambda, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \Lambda, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \Lambda, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R 1} & h_{N_R 2} & \Lambda & h_{N_R N_T} \end{bmatrix} \begin{bmatrix} x_1 \\ x_2 \\ M \\ x_j \\ M \\ x_{N_T} \end{bmatrix} + \begin{bmatrix} n_1 \\ n_2 \\ M \\ n_j \\ M \\ n_{N_T} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, information mapped to a layer includes x_1 and x_2 and each element p_ij of 4×2 matrix is a weight used for precoding. y_1, y_2, y_3 and y_4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*U^H=I' (herein, U^ H means an Hermit matrix of matrix U), the above-mentioned inverse processing of the precoding may be performed in a manner of multiplying the received signal by Hermit matrix PH of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL.

Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel information and an RS used for data demodulation. The former has an object of obtaining, by a UE, to obtain channel information in the downlink. Accordingly, a corresponding RS must be transmitted in a wideband, and a UE must be capable of receiving and measuring the RS although the UE does not receive downlink data in a specific subframe. Furthermore, the former is also used for measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain× 12 subcarriers in a frequency domain. That is, in a time axis (an x axis), one resource block pair has a length of 14 OFDM symbols in the case of a normal cyclic prefix (CP) (FIG. 8a) and has a length of 12 OFDM symbols in the case of an extended cyclic prefix (CP) (FIG. 8b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A rule for mapping the CRS to a resource block is defined as follows.

$$k = 6m + (v + v_{shift}) \bmod 6 \qquad \text{[Equation 13]}$$

$$l = \begin{cases} 0, N_{symb}^{DL} - 3 & \text{if } p \in \{0, 1\} \\ 1 & \text{if } p \in \{2, 3\} \end{cases}$$

-continued $$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 13, k and l represent sub-carrier index and symbol index, respectively, and p represents an antenna port. $N_{symb}^{DL}$ represents the number of OFDM symbols in one downlink slot, and NE represents the number of radio resources allocated to the downlink. $n_s$ represents a slot index, and $N_{ID}^{cell}$ represents the cell ID. mod represents the modulo operation. The location of a reference signal in the frequency domain changes according to the $v_{shift}$ value. Since $v_{shift}$ depends on the cell ID (namely physical layer cell ID), the location of a reference signal has various cell-dependent frequency shift values.

More specifically, in order to improve channel estimation performance through a CRS, the location of the CRS may be shifted in the frequency domain depending on the related cell. For example, when the reference signal is located at intervals of three subcarriers, reference signals in one cell are allocated to the 3 k-th subcarrier, and reference signals in the other cells are allocated to the (3 k+1)-th subcarrier. From the viewpoint of one antenna port, the reference signals are arranged at intervals of six resource elements in the frequency domain and separated from the reference signal allocated to another antenna port by three resource element intervals.

In the time domain, reference signals are arranged at constant intervals starting from the symbol index 0 of each slot. The time interval is defined differently depending on the cyclic prefix length. In the case of a normal cyclic prefix, the reference signal is located at the symbol index 0 and 4 of each slot while, in the case of extended cyclic prefix, the reference signal is located at the symbol index 0 and 3 of each slot. A reference signal for an antenna port having the largest value of two antenna ports is defined in one OFDM symbol. Therefore, in the case of transmission employing four transmission antennas, the reference signals for the reference signal antenna ports 0 and 1 are located at symbol indices of 0 and 4 (symbol indices of 0 and 3 in the case of extended cyclic prefix) of each slot; and the reference signals for antenna ports 2 and 3 are located at symbol index of 1 of the slot. The reference signals for antenna ports 2 and 3 in the frequency domain change their positions with each other in the second slot.

In what follows, DRS will be described in more detail. DRS is used for demodulating data. A precoding weight used for a specific UE in the MIMO transmission is used without any change in order to estimate the corresponding channel by being combined with a transmission channel transmitted from each transmission antenna when the UE receives a reference signal.

The 3GPP LTE system (for example, Release-8) supports up to four transmission antennas, and a DRS for rank 1 beamforming is defined. The DRS for rank 1 beamforming also represents a reference signal for antenna port index 5.

A rule for mapping the DRS into a resource block is defined as follows. Equation 14 represents the case of normal cyclic prefix, and Equation 15 represents the case of extended cyclic prefix.

$$k = (k') \bmod N_{sc}^{RB} + N_{sc}^{RB} \cdot n_{PRB} \qquad \text{[Equation 14]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{[Equation 15]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equation 14 and 15, k and l represent sub-carrier index and symbol index, respectively, and p represents an antenna port. $N_{sc}^{RB}$ represents the resource block size in the frequency domain and is expressed by the number of sub-carriers. $n_{PRB}$ represents the number of physical resource blocks. $N_{RB}^{PDSCH}$ represents the frequency domain of a resource block for PDSCH transmission. $n_s$ represents the slot index, and $N_{ID}^{cell}$ represents the cell ID. mod represent the modulo operation. The location of a reference signal in the frequency domain changes according to the $v_{shift}$ value. Since $v_{shift}$ depends on the cell ID (namely physical layer cell ID), the location of a reference signal has various cell-dependent frequency shift values.

The LTE-A system, which is an evolved form of the LTE system, has to be designed to support up to 8 transmission antennas to the downlink of an eNB. Therefore, RS for up to 8 transmission antennas also has to be supported. In the LTE system, since a downlink RS is defined only for up to four antenna ports, when the eNB has four or more and up to eight downlink transmission antennas in the LTE-A system, the RS has to be additionally defined and designed to deal with these antenna ports. The RS for up to 8 transmission antenna ports has to be designed for both the channel measurement and the data demodulation as described above.

One of important factors to be considered in designing the LTE-A system is backward compatibility; namely, an LTE UE is required to operate smoothly in the LTE-A system, and the system has to also support the operation. In view of RS transmission, an RS has to be defined additionally for up to 8 transmission antenna ports in the time-frequency region in which a CRS defined in the LTE system is transmitted over the whole frequency band at each subframe. If an RS pattern for up to 8 transmission antennas is added in the LTE-A system over the whole frequency band for each subframe in the same way as the CRS of the existing LTE system, the RS overhead becomes excessively large.

Therefore, the RS newly designed in the LTE-A system may be classified largely into two types: an RS for channel measurement to select MCS, PMI, and the like (CSI-RS: Channel State Information-RS, Channel State Indication-RS, and so on) and an RS for demodulation of data transmitted by 8 transmission antennas (DM-RS: Data Demodulation-RS).

The CSI-RS intended for channel measurement is designed for the sole purpose of channel measurement unlike the conventional CRS which is used not only for channel measurement and measurement of handover but also for data modulation. However, it should be noted that the CSI-RS may also be used for the purpose of measurement of handover and the like. Unlike the CRS, the CSI-RS is not necessarily to be transmitted at each subframe, since the CSI-RS is transmitted only for the purpose of obtaining information about a channel state. To reduce the overhead of the CSI-RS, the CSI-RS is transmitted intermittently along the time axis.

For data demodulation, a dedicated DM-RS is transmitted to the UE scheduled in the corresponding time-frequency region. In other words, the DM-RS of a specific UE is transmitted only in the time-frequency region in which the corresponding UE is scheduled, namely the corresponding UE receives data.

In the LTE-A system, an eNB has to transmit a CSI-RS for all of the antenna ports. Since transmitting a CSI-RS for up to 8 transmission antenna ports at each subframe causes excessive overhead, the CSI-RS has to be transmitted intermittently along the time axis rather than being transmitted at each subframe to reduce overhead. In other words, the CSI-RS may be transmitted repeatedly with a period of integer multiples of one subframe or transmitted with a specific transmission pattern. At this time, the eNB may determine the period or pattern by which the CSI-RS is transmitted.

To measure a CSI-RS, the UE has to be aware of the information about a transmission subframe index of a CSI-RS for each CSI-RS antenna port of a cell to which the UE belongs, time-frequency position of a CSI-RS resource element (RE) within the transmission subframe, and CSI-RS sequence.

The eNB in the LTE-A system has to transmit a CSI-RS to each of up to 8 antenna ports. The resources used for CSI-RS transmission of different antenna ports have to be orthogonal to each other. When one eNB transmits CSI-RS for different antenna ports, the eNB may allocate the resources orthogonally according to the FDM/TDM scheme by mapping the CSI-RS for each antenna port to different RE. Similarly, the CSI-RS for different antenna ports may be transmitted according to the CDM scheme in which the CSI-RS is mapped to orthogonal codes.

When the eNB informs an UE belonging to the cell of the eNB about the information of the CSI-RS, the eNB has to inform the UE of the information about the time and frequency to which the CSI-RS for each antenna port is mapped. More specifically, the information may include numbers of subframes to which CSI-RS is transmitted, period at which the CSI-RS is transmitted, subframe offset with which the CSI-RS is transmitted, number of OFDM symbol to which a CSI-RS RE of a specific antenna is transmitted, frequency spacing, and offset or shift of an RE on the frequency axis.

FIG. 9 illustrates a method for transmitting a CSI-RS periodically in a wireless communication system to which the present invention may be applied.

As shown in FIG. 9, in the case of an eNB transmitting a CSI-RS, the transmission period of the CSI-RS set for the corresponding eNB is 10 ms (or subframes), and the CSI-RS transmission offset is 3 (subframes). The offset value may be different for different eNBs so that CSI-RS of various cells may be distributed evenly in the time domain. In the case of an eNB to which CSI-RS is transmitted with a period of 10 ms, the offset may have one of 10 values ranging from 0 to 9. This offset value represents the value of a subframe at which an eNB having a specific period actually starts transmission of CSI-RS. If the eNB informs of the period and offset value of CSI-RS, a UE measures the CSI-RS of the eNB at the corresponding position by using the values and reports information such as CQI/PMI/RI to the eNB. The aforementioned information related to the CSI-RS is all cell-specific information.

FIG. 10 illustrates a method for transmitting a non-periodic CSI-RS in a wireless communication system to which the present invention may be applied.

FIG. 10 illustrates a method by which CSI-RS is transmitted according to a transmission subframe pattern. The CSI-RS transmission pattern consists of 10 subframes, and whether to transmit CSI-RS is designated by a 1-bit indicator in each subframe.

In general, the following two methods are used for an eNB to inform a UE of the CSI-RS configuration.

First, a first method based on DBCH (Dynamic BCH) signaling may be considered.

The first method operates such that the eNB broadcasts information about the CSI-RS configuration over UEs. In the LTE system, when system information is informed to UEs, the corresponding information is usually transmitted to the BCH (Broadcasting Channel). However, if the amount of the information is too big to be transmitted to the BCH, the information is anyhow transmitted in the same way as ordinary data, but the PDCCH of the corresponding data is transmitted being CRC-masked with SI-RNTI (System Information RNTI) rather than a specific UE ID (for example, C-RNTI). And actual system information is transmitted to the PDSCH area, as ordinary unicast data is transmitted. Then, all the UEs in the cell decode the PDCCH by using the SI-RNTI and obtains system information by decoding the PDSCH indicated by the corresponding PDCCH. This type of broadcasting method is called DBCH (Dynamic BCH) to distinguish it from the general broadcasting method, PBCH (Physical BCH).

The system information broadcast in the LTE system may be roughly divided into two types. That is, a master information block (MIB) transmitted to the PBCH and system information block (SIB) transmitted to the PDSCH and multiplexed with ordinary unicast data to be transmitted. Since information transmitted to the SIB type 1 to SIB type 8 (SIB 1 to SIB 8) is predefined in the LTE system, CSI-RS configuration is transmitted to SIB 9 and SIB 10 which are newly introduced in the LTE-A system.

Next, the second method based on RRC signaling may be considered.

The second method operates such that the eNB informs each UE of the information about CSI-RS configuration through dedicated RRC signaling. The eNB informs the UE of the CSI-RS configuration through RRC signaling while a UE establishes a connection to the eNB through an initial connection or handover. Similarly, the eNB informs the UE of the CSI-RS configuration through an RRC signaling message requesting channel state feedback based on CSI-RS measurement.

CSI-RS is transmitted through one, two, four, or eight antenna ports. At this time, the antenna ports used are p=15; p=15, 16; p=15, . . . , 18; and p=15, . . . , 22, respectively. CSI-RS may be defined only for the subcarrier interval of $\Delta f=15$ kHz.

A CSI-RS sequence may be generated by using Equation 16 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

[Equation 16]

In Equation 16, $r_{l,n_s}(m)$ represents a generated CSI-RS sequence, c(i) represents a pseudo-random sequence, $n_s$ represents the slot number within a radio frame, l represents the OFDM symbol number in a slot, and $N_{RB}^{max,DL}$ represents the maximum number of RBs in the downlink bandwidth.

A pseudo-random sequence generator is initialized at each start of the OFDM symbol as shown in Equation 17.

$$c_{init}=2^{10} \cdot (7 \cdot (n_s+1)+l+1) \cdot (2 \cdot N_{ID}^{cell}+1)+2 \cdot N_{ID}^{cell}+N_{CP}$$

[Equation 17]

In Equation 17, $N_{ID}^{cell}$ represents the cell ID, and $N_{CP}=1$ in the case of a normal CP, and $N_{CP}=0$ in the case of extended CP.

Within the subframe configured for CSI-RS transmission, the CSI-RS sequence generated by using Equation 16 is mapped to the complex-valued modulation symbol, $a_{k,l}^{(p)}$, which is used as a reference symbol on each antenna port (p), as shown in Equation 18 below.

$$a_{k,l}^{(p)} = w_{l''} \cdot r_{l,n_s}(m')$$

[Equation 18]

$$k = k' + 12m +
\begin{cases}
-0 & \text{for } p \in \{15, 16\}, \text{normal cyclic prefix} \\
-6 & \text{for } p \in \{17, 18\}, \text{normal cyclic prefix} \\
-1 & \text{for } p \in \{19, 20\}, \text{normal cyclic prefix} \\
-7 & \text{for } p \in \{21, 22\}, \text{normal cyclic prefix} \\
-0 & \text{for } p \in \{15, 16\}, \text{extended cyclic prefix} \\
-3 & \text{for } p \in \{17, 18\}, \text{extended cyclic prefix} \\
-6 & \text{for } p \in \{19, 20\}, \text{extended cyclic prefix} \\
-9 & \text{for } p \in \{21, 22\}, \text{extended cyclic prefix}
\end{cases}$$

$$l = l'' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 18, the condition for (k', l') (where k' represents the subcarrier index within a resource block and l' represents the OFDM symbol index within a slot) and $n_s$ is determined according to the CSI-RS configuration as shown in Table 3 or 4.

Table 3 illustrates the mapping from CSI-RS configuration to (k', l') in the case of normal CP.

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | $n_s$, mod 2 | (k', l') | $n_s$, mod 2 | (k', l') | $n_s$, mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |

TABLE 3-continued

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$, mod 2 | (k', l') | $n_s$, mod 2 | (k', l') | $n_s$, mod 2 |
|  | 17 | (0, 2) | 1 |  |  |  |  |
|  | 18 | (3, 5) | 1 |  |  |  |  |
|  | 19 | (2, 5) | 1 |  |  |  |  |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 |  |  |
|  | 24 | (8, 1) | 1 | (8, 1) | 1 |  |  |
|  | 25 | (6, 1) | 1 | (6, 1) | 1 |  |  |
|  | 26 | (5, 1) | 1 |  |  |  |  |
|  | 27 | (4, 1) | 1 |  |  |  |  |
|  | 28 | (3, 1) | 1 |  |  |  |  |
|  | 29 | (2, 1) | 1 |  |  |  |  |
|  | 30 | (1, 1) | 1 |  |  |  |  |
|  | 31 | (0, 1) | 1 |  |  |  |  |

Table 4 illustrates the mapping from CSI-RS configuration to (k', l') in the case of extended CP.

TABLE 4

|  | CSI reference signal configuration | Number of CSI reference signals configured | | | | | |
|---|---|---|---|---|---|---|---|
|  |  | 1 or 2 | | 4 | | 8 | |
|  |  | (k', l') | $n_s$, mod 2 | (k', l') | $n_s$, mod 2 | (k', l') | $n_s$, mod 2 |
| Frame structure type 1 and 2 | 0 | (11, 4) | 0 | (11, 4) | 0 | (11, 4) | 0 |
|  | 1 | (9, 4) | 0 | (9, 4) | 0 | (9, 4) | 0 |
|  | 2 | (10, 4) | 0 | (10, 4) | 0 | (10, 4) | 0 |
|  | 3 | (9, 4) | 1 | (9, 4) | 1 | (9, 4) | 1 |
|  | 4 | (5, 4) | 0 | (5, 4) | 0 |  |  |
|  | 5 | (3, 4) | 0 | (3, 4) | 0 |  |  |
|  | 6 | (4, 4) | 1 | (4, 4) | 1 |  |  |
|  | 7 | (3, 4) | 1 | (3, 4) | 1 |  |  |
|  | 8 | (8, 4) | 0 |  |  |  |  |
|  | 9 | (6, 4) | 0 |  |  |  |  |
|  | 10 | (2, 4) | 0 |  |  |  |  |
|  | 11 | (0, 4) | 0 |  |  |  |  |
|  | 12 | (7, 4) | 1 |  |  |  |  |
|  | 13 | (6, 4) | 1 |  |  |  |  |
|  | 14 | (1, 4) | 1 |  |  |  |  |
|  | 15 | (0, 4) | 1 |  |  |  |  |
| Frame structure type 2 only | 16 | (11, 1) | 1 | (11, 1) | 1 | (11, 1) | 1 |
|  | 17 | (10, 1) | 1 | (10, 1) | 1 | (10, 1) | 1 |
|  | 18 | (9, 1) | 1 | (9, 1) | 1 | (9, 1) | 1 |
|  | 19 | (5, 1) | 1 | (5, 1) | 1 |  |  |
|  | 20 | (4, 1) | 1 | (4, 1) | 1 |  |  |
|  | 21 | (3, 1) | 1 | (3, 1) | 1 |  |  |
|  | 22 | (8, 1) | 1 |  |  |  |  |
|  | 23 | (7, 1) | 1 |  |  |  |  |
|  | 24 | (6, 1) | 1 |  |  |  |  |
|  | 25 | (2, 1) | 1 |  |  |  |  |
|  | 26 | (1, 1) | 1 |  |  |  |  |
|  | 27 | (0, 1) | 1 |  |  |  |  |

Referring to Table 3 and Table 4, in order to reduce inter-cell interference (ICI) during transmission of CSI-RS in a multi-cell environment including a heterogeneous network environment, up to 32 (for normal CP) or up to 28 (for extended CP) different configurations are defined.

The CSI-RS configuration differs according to the number of antenna ports and CP within a cell, and adjacent cells may have as much different configurations as possible. Also, the CSI-RS configuration may be divided into two types according to its frame structure: a configuration applied to both the FDD and the TDD frame and a configuration applied only to the TDD frame.

According to the CSI-RS configuration based on Table 3 and 4, (k', l') and $n_s$ are determined, and if (k', l') and $n_s$ are applied to Equation 18, the time-frequency resource that each CSI-RS antenna port uses for CSI-RS transmission is determined.

FIG. 11 illustrates a CSI-RS configuration in a wireless communication system to which the present invention may be applied.

In particular, FIG. 11 illustrates a CSI-RS configuration according to Equation 18 and Table 3 (namely in the case of normal CP).

FIG. 11(a) illustrates 20 CSI-RS configurations that may be used for CSI-RS transmission through one or two CSI-RS antennas, FIG. 11(b) illustrates 10 CSI-RS configurations that may be used for CSI-RS transmission through 4 CSI-RS antennas, and FIG. 11(c) illustrates 5 CSI-RS configurations that may be used for CSI-RS transmission through 8 CSI-RS antenna ports.

In this manner, radio resources (namely RE pairs) to which CSI-RS is transmitted according to each CSI-RS configuration are determined.

If one or two antenna ports are configured for CSI-RS transmission with respect to a specific cell, CSI-RS is transmitted on the radio resource according to the CSI-RS configuration from among the 20 CSI-RS configurations shown in FIG. 11(a).

In the same manner, if four antenna ports are configured for CSI-RS transmission with respect to a specific cell, CSI-RS is transmitted on the radio resource according to the CSI-RS configuration from among the 10 CSI-RS configurations shown in FIG. 11(b). Also, if eight antenna ports are configured for CSI-RS transmission with respect to a specific cell, CSI-RS is transmitted on the radio resource according to the CSI-RS configuration from among the 5 CSI-RS configurations shown in FIG. 11(c).

For each two antenna port pairs (namely {15, 16}, {17, 18}, {19, 20}, {21, 22}), CSI-RS with respect to each antenna port is transmitted by being code division multiplexed to the same radio resource. To illustrate the examples of antenna port 15 and 16, although CSI-RS complex symbols are the same for the antenna port 15 and 16, the CSI-RS complex symbols are multiplied by different orthogonal codes (for example Walsh code) to be mapped to the same radio resource. The complex symbol of CSI-RS with respect to the antenna port 15 and the complex symbol of CSI-RS with respect to the antenna port 16 are mapped to the same radio resource after being multiplied by [1, 1] and [1 −1] respectively. The same operation is applied to the antenna port pairs {17, 18}, {19, 20}, and {21, 22}.

The UE may detect CSI-RS with respect to a specific antenna port by multiplying a transmitted symbol by the multiplied code. In other words, to detect CSI-RS with respect to the antenna port 15, the transmitted symbol is multiplied by the multiplied code [1 1] while the transmitted symbol is multiplied by the multiplied code [1 −1] to detect CSI-RS with respect to the antenna port 16.

Referring to FIG. 11(a) to (c), in the case of the same CSI-RS configuration index, radio resources according to the CSI-RS configuration involving a larger number of antenna ports include the radio resources according to the CSI-RS configurations having a smaller number of CSI-RS antenna ports. For example, in the case of CSI-RS configuration 0, radio resources for 8 antenna ports include all of the radio resources for 4 antenna ports and 1 or 2 antenna ports.

A plurality of CSI-RS configurations may be used for one cell. Non-zero power (NZP) CSI-RS may use zero or only one CSI-RS configuration, and zero power (ZP) CSI-RS may use zero or a plurality of CSI-RS configurations.

For each bit set to 1 in the ZP CSI-RS (ZeroPowerCSI-RS), which is a 16-bit bitmap set by the upper layer, the UE assumes zero transmission power for the REs corresponding to the four CSI-RS columns of Table 3 and Table 4 (except for the case of overlapping with RE assuming NZP CSI-RS set by upper layer). The most significant bit (MSB) corresponds to the lowest CSI-RS configuration index, and the next bit in the bitmap corresponds to the next CSI-RS configuration index in order.

CSI-RS is transmitted only in the downlink slot which satisfies the ($n_s$ mod 2) condition of Table 3 and 4 and the subframe which satisfies the CSI-RS subframe configuration.

In the case of frame structure type 2 (TDD), CSI-RS is not transmitted in the subframe which collides with the transmission of a special subframe, synchronization signal (SS), PBCH, or SIB 1 (SystemInformationBlockType1) message or in the subframe configured for transmission of a paging message.

Also, the RE to which CSI-RS for some antenna port belonging to the set of antenna ports S (S={15}, S={15, 16}, S={17, 18}, S={19, 20}, or S={21, 22}) is transmitted is not used for CSI-RS transmission of PDSCH or other antenna port.

Since time-frequency resources used for CSI-RS transmission may not be used for data transmission, data throughput is decreased as the CSI-RS overhead is increased. In this respect, the CSI-RS is configured not to be transmitted every subframe but to be transmitted every predetermined transmission period corresponding to a plurality of subframes. In this case, the CSI-RS transmission overhead may be reduced considerably compared with the case in which CSI-RS is transmitted at each subframe.

The subframe period for CSI-RS transmission (in what follows, it is called a 'CSI transmission period', $T_{CSI-RS}$) and subframe offset ($\Delta_{CSI-RS}$) are shown in Table 5 below.

Table 5 illustrates the CSI-RS subframe configuration.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, CSI-RS transmission period ($T_{CSI-RS}$) and subframe offset ($\Delta_{CSI-RS}$) are determined according to the CSI-RS subframe configuration ($I_{CSI-RS}$).

The CSI-RS subframe configuration of Table 5 may be set by either of the 'SubframeConfig' field and 'zeroTxPower-SubframeConfig' field of Table 2. The CSI-RS subframe configuration may be set separately with respect to the NZP CSI-RS and ZP CSI-RS.

A subframe including CSI-RS satisfies Equation 19 below.

$$(10n_f + \lfloor n_s/2 \rfloor - \Delta_{CSI-RS}) \bmod T_{CSI-RS} = 0 \quad \text{[Equation 19]}$$

In Equation 19, $T_{CSI-RS}$ represents the CSI-RS transmission period, $\Delta_{CSI-RS}$ represents the subframe offset value, $n_f$ represents the system frame number, and $n_s$ represents the slot number.

In the case of a UE set for transmission mode 9 with respect to a serving cell, the UE may be set by one CSI-RS resource configuration. In the case of a UE set for transmission mode 10 with respect to a serving cell, the UE may be set by one or more CSI-RS resource configuration(s).

For each CSI-RS resource configuration, the following parameters are configured through upper layer signaling.

CSI-RS resource configuration identifier when transmission mode 10 is set

The number of CSI-RS ports

CSI-RS configuration (refer to Table 3 and 4)

$I_{CSI-RS}$ subframe configuration ($I_{CSI-RS}$) (refer to Table 5)

Transmission power ($P_C$) for CSI feedback when TRANSMISSION mode 9 is set

Transmission power ($P_C$) for CSI feedback with respect to each CSI process when transmission mode 10 is set. If CSI subframe sets $C_{CSI,0}$ and $C_{CSI,1}$ are configured by the upper layer with respect to a CSI process, $P_C$ is configured for each CSI subframe set of the CSI process.

Pseudo-random sequence generator parameter ($n_{ID}$)

Upper layer parameter (qcl-CRS-Info-r11) including QCL scrambling identifier (qcl-ScramblingIdentity-r11) for QCL (QuasiCo-Located) type B UE assumption, CRS port count (crs-PortsCount-r11), and MBSFN subframe configuration list (mbsfn-SubframeConfigList-r11) parameter when transmission mode 10 is set.

When the CSI feedback value derived by the UE falls in the range of [−8, 15] dB, $P_C$ is assumed to be the ratio of PDSCH EPRE to CSI-RS EPRE. Here, PDSCH EPRE corresponds to the symbol where the ratio of PDSCH EPRE to CRS EPRE is $\rho_A$.

CSI-RS and PMCH are not configured together in the same subframe of a serving cell.

When four CSR antenna ports are configured in the frame structure type 2, the CSI-RS configuration index belonging to [20-31] set (refer to Table 3) in the case of normal CP and belonging to [16-27] set (refer to Table 40 in the case of extended CP is not set for the UE.

The UE may assume that the CSI-RS antenna ports based on the CSI-RS resource configuration have a QCL relationship with respect to delay spread, Doppler spread, Doppler shift, average gain, and average delay.

The UE configured for transmission mode 10 and QCL type B may assume that the antenna ports 0 to 3 corresponding to CSI-RS resource configuration and the antenna ports 15 to 22 corresponding to CSI-RS resource configuration hold a QCL relationship with respect to Doppler spread and Doppler shift.

In the case of UE configured for transmission mode 10, one or more CSI-IM (Channel-State Information-Interference Measurement) resource configurations may be set with respect to the serving cell.

Through upper layer signaling, the following parameters may be configured for each CSI-IM resource configuration.

ZP CSI-RS configuration (refer to Table 3 and 4)

ZP CSI RS subframe configuration ($I_{CSI-RS}$) (refer to Table 5)

The CSI-IM resource configuration is the same as one of the set ZP CSI-RS resource configurations.

The CSI-IM resource and PMCH are not configured simultaneously in the same subframe of a serving cell.

In the case of a UE configured for transmission mode 1 to 9, one ZP CSI-RS resource configuration may be set for the UE with respect to the serving cell. In the case of a UE configured for transmission mode 10, one or more ZP CSI-RS resource configurations may be set for the UE with respect to the serving cell.

Through upper layer signaling, the following parameters may be configured for ZP CSI-RS resource configuration.

ZP CSI-RS configuration list (refer to Table 3 and 4)

ZP CSI-RS subframe configuration ($I_{CSI-RS}$) (refer to Table 5)

ZP CSI-RS and PMCH are not configured simultaneously in the same subframe of the serving cell.

CoMP (Coordinated Multi-Point Transmission and Reception)

According to the requirements on the LTE-A system, CoMP transmission has been proposed to improve system performance.

CoMP refers to the technology by which two or more eNBs, (Access) Points, or cells cooperate with each other to communicate with a specific UE to improve communication performance between the specific UE and eNB, (Access) Point, or cell. CoMP is also referred to as co-MIMO, collaborative MIMO, and network MIMO. CoMP is expected to improve the performance of UEs located at cell edges and improve the average cell (sector) throughput.

In the present document, eNB, (Access) Point, and cell are used in the same meaning.

In general, inter-cell interference reduces performance and average cell (sector) efficiency of a UE located at a cell boundary in a multi-cell environment of which the frequency reuse index is 1. In order to mitigate inter-cell interference, a simple passive method such as fractional frequency reuse (FFR) has been used in the LTE system so that UEs at cell edges have appropriate performance efficiency in an interference-limited environment. However, instead of reducing the use of frequency resources per cell, it is more advantageous for a UE to use a method of reusing or mitigating inter-cell interference as a desired signal to be received by the UE. In order to achieve the object above, a transmission method based on CoMP may be applied.

CoMP that may be applied to downlink may be divided into JP (Joint Processing) and CS/CB (Coordinated Scheduling/Beamforming) schemes.

In the case of JP scheme, data from each eNB performing CoMP to a UE are transmitted instantaneously and simultaneously, and the UE combines signals from individual eNBs to improve reception performance. On the other hand, in the case of CS/CB scheme, data directed to one UE are transmitted instantaneously through one eNB, and scheduling or beamforming is performed so that interference due to the UE may be minimized on other eNBs.

According to the JP scheme, data may be used at each point (eNB) in CoMP unit. CoMP unit refers to a set of eNBs based on CoMP. The JP scheme may be further divided into joint transmission and dynamic cell selection scheme.

Joint transmission refers to a scheme by which a signal is transmitted simultaneously through PDSCH from a plurality of points which form the whole or part of the CoMP unit. In other words, data transmitted to a single UE may be transmitted from a plurality of transmission points. Through the joint transmission scheme, quality of a signal transmitted to a UE may be improved coherently or non-coherently, and interference on other UEs may be removed actively.

Dynamic cell selection scheme refers to a scheme by which a signal is transmitted through PDSCH from a single point in the CoMP unit. In other words, data transmitted to a single UE at a specific time is transmitted from a single point while data is not transmitted to the UE from other points of the CoMP unit. Points transmitting data to a UE may be selected dynamically.

According to CS/CB scheme, CoMP unit performs beamforming in cooperation with each other to transmit data to a single UE. In other words, although only the serving cell transmits data to a UE, user scheduling/beamforming may be determined through cooperation among a plurality of cells in the CoMP unit.

In the case of uplink, CoMP reception refers to receiving a signal transmitted through cooperation among a plurality of points separated geographically from each other. CoMP scheme that may be applied for uplink may be divided into JR (Joint Reception) and CS/CB (Coordinated Scheduling/Beamforming) scheme.

Joint Reception refers to the scheme in which a plurality of points which form the whole or part of the CoMP unit receive a signal transmitted through PDSCH. In the CS/CB scheme, a signal is received through PDSCH only at a single point, but user scheduling/beamforming may be determined through coordination among a plurality of cells in the CoMP unit.

Method for constructing a parametric codebook

In what follows, for the description of the present invention, the name of a base station is applied to a Tx and Rx point (TP (Transmission Point)/RP (Reception Point)) such as a cell, eNB, sector, RRH (Remote Radio Head), and relay, which is also used as a generic term for distinguishing a component carrier from a specific Tx/Rx point.

In what follows, for the convenience of description, the proposed method will be described with respect to the 3GPP LTE system. However, the scope of the system to which the proposed method is applied may be extended to other systems in addition to the 3GPP LTE system.

According to the change of wireless communication environments, an appropriate change is also required for the codebook used for MIMO (Multiple Input Multiple Output) transmission; in particular, as the number of employed antennas is increased, the importance of designing an efficient codebook is increasing accordingly. In the LTE release 8, the "LTE-4Tx codebook" applied up to four antenna elements has been proposed, which is designed to utilize 4-bit feedback and to maximize the shortest distance between code vectors. The LTE-4Tx code book may be applied to channels with various features, providing excellent performance particularly for a channel model showing low correlation. In the case of "LTE-A 8Tx codebook" applied after the LTE-Advanced (LTE-A) release 10, differently from the LTE-4Tx codebook which has a fixed structure, the code vector may be selected adaptively according to the channel condition. From a 4×32 DFT matrix, four consecutive code vectors are selected and used as a codebook, which shows excellent performance in a channel condition showing a relatively high correlation.

When the phase difference between adjacent elements of an antenna is equally spaced, a codebook design based on a DFT matrix and its variant is more appropriate, and there are other codebooks in a modified form from the codebook design. Also, it is possible to select code vectors within the codebook by utilizing a vector quantization (VQ) technique, which searches for optimal code vectors for a given channel condition by applying the Lloyd-Max algorithm; the VQ technique provides optimal performance but at the same time, exhibits a drawback of increasing complexity significantly due to utilization of the search process.

In what follows, the present invention proposes a codebook based on a new structure complementing the drawback and limitation of existing codebooks. While DFT-based codebooks including the existing LTE-4Tx and LTE-A 8Tx codebook show characteristics more suitable for a specific channel condition, the codebook according to the present invention allows a code vector to be selected adaptively depending on the channel conditions and may be defined through only a few parameters.

To overcome the limitation of existing codebooks characterized by low adaptability, the present invention proposes a parametric codebook employing three (or more) parameters.

In what follows, detailed descriptions and embodiments related to the codebook according to the present invention will be described.

In what follows, for the convenience of descriptions, descriptions of the present invention are given with respect to one-dimensional antennas, but the present invention is not limited to the specific descriptions. In other words, the proposed method described below may also be applied to the codebook design for multi-dimensional antenna systems (for example, two-dimensional (2D) AAS (Active Antenna System)). For example, the proposed method described below may be equally applied to the codebook design for constructing code vectors applied to the antenna of horizontal dimension and/or antenna of vertical dimension in the 2D AAS.

The codebook according to the present invention may be constructed by using parameters. Parameters for constructing a codebook according to the present invention may include phase $\alpha$ of a first code vector of the codebook, phase difference $\beta$ between code vectors and/or the number of feedback bits $\gamma$ of the codebook.

These parameters may be determined according to the characteristics of a channel received by a receiving end (for example, an eNB or a UE) from a transmitting end. Therefore, parameters selected properly by the receiving end allow beamforming to be performed properly according to the characteristics of a given channel.

The code vector of the codebook proposed in the present invention reflects characteristics of a DFT matrix having a constant phase difference between adjacent elements, and code vector elements having various sizes and characteristics may be generated through the parameters.

The n-th element of the m-th code vector of a codebook according to the present invention may be defined by Equation 20 below.

$$w_{n,m} = \frac{1}{\sqrt{N}} \exp(jn(\alpha + \beta m)), \quad \text{[Equation 20]}$$
$$n = 0, 1, \ldots, N-1, m = 0, 1, \ldots, M-1$$

In Equation 20, N represents the number of transmitting antennas, and M represents the number of code vectors constructing a codebook (or code vectors that may be used for constructing a codebook). The number of code vectors, M, may be expressed by the number of feedback bits $\gamma$ as $M=2^\gamma$. Here, the number of feedback bits $\gamma$ of the codebook represents the number of feedback bits needed when the receiving end feeds back one or more code vectors, which are selected based on the channel condition in the codebook constructed by using the parameters, to the transmitting end (for example, when a UE feeds back the PMI to an eNB).

An N×M codebook matrix applied to N transmitting antennas using Equation 20 is constructed as shown in Equation 21.

$$W[N \times M] = \frac{1}{\sqrt{N}} \begin{bmatrix} 1 & 1 & 1 & \cdots & 1 \\ e^{j\alpha} & e^{j(\alpha+\beta)} & e^{j(\alpha+2\beta)} & \cdots & e^{j(\alpha+(M-1)\beta)} \\ e^{2j\alpha} & e^{2j(\alpha+\beta)} & e^{2j(\alpha+2\beta)} & \cdots & e^{2j(\alpha+(M-1)\beta)} \\ \vdots & \vdots & \vdots & \ddots & \vdots \\ e^{(N-1)j\alpha} & e^{(N-1)j(\alpha+\beta)} & e^{(N-1)j(\alpha+2\beta)} & \cdots & e^{2j(\alpha+(M-1)\beta)} \end{bmatrix} \quad \text{[Equation 21]}$$

In Equation 21, each column of the codebook matrix W represents a code vector of size N, and $M=2^\gamma$ represents the number of code vectors.

In what follows, characteristics of a parametric codebook according to the present invention and difference between the parametric codebook and conventional codebook will be described in more detail.

Among the conventional codebooks, the LTE-4Tx codebook suitable for channels with low correlation exhibits acceptable overall performance for various channel environments. However, when correlation between adjacent antennas increases according as antenna structure is changed, the LTE-A 8Tx codebook and the DFT-based codebook become to show better performance.

The LTE-A 8Tx codebook is a two-bit feedback codebook for selecting four consecutive code vectors from a 4×32 DFT matrix D, where the matrix D is constructed as shown in Equation 22 below.

$$D = \frac{1}{2}\begin{bmatrix} 1 & 1 & 1 & \ldots & 1 \\ 1 & e^{j2\pi/32} & e^{j4\pi/32} & \ldots & e^{j62\pi/32} \\ 1 & e^{j4\pi/32} & e^{j8\pi/32} & \ldots & e^{j124\pi/32} \\ 1 & e^{j6\pi/32} & e^{j12\pi/32} & \ldots & e^{j186\pi/32} \end{bmatrix} \quad \text{[Equation 22]}$$

The m-th vector of the matrix D is denoted as $d_m$, which is shown in Equation 23.

$$d_{n,m} = \frac{1}{2}\exp\left(j\frac{2\pi mn}{32}\right), \quad \text{[Equation 23]}$$
$$n = 0, 1, 2, 3, m = 0, 1, \ldots, 31$$

When D is expressed as $D=[d_0 d_1 \ldots d_{31}]$, the k-th codebook from the DFT matrix D is selected by Equation 24 below.

$$W^{(k)} = [d_{(2k \bmod 32)} d_{((2k+1) \bmod 32)} d_{((2k+2) \bmod 32)} d_{((2k+3) \bmod 32)}] \quad \text{[Equation 24]}$$

From Equation 24, a total of 16 codebooks are generated according to k=0, 1, . . . , 15.

$$W[N \times M] = \quad \text{[Equation 25]}$$
$$\frac{1}{\sqrt{N}}\begin{bmatrix} 1 & 1 & 1 & 1 \\ e^{j2T\pi/32} & e^{j2(T+1)\pi/32} & e^{j2(T+2)\pi/32} & e^{j2(T+3)\pi/32} \\ e^{j4T\pi/32} & e^{j4(T+1)\pi/32} & e^{j4(T+2)\pi/32} & e^{j4(T+3)\pi/32} \\ e^{j6T\pi/32} & e^{j6(T+1)\pi/32} & e^{j6(T+2)\pi/32} & e^{j6(T+3)\pi/32} \end{bmatrix},$$

$T = (2k \bmod 32)$

The LTE-A 8Tx codebook has an advantage that it selects a code vector that performs beamforming according to a specific situation.

However, since the size of the codebook is 2 bits, the phase difference between code vector elements is fixed to π/16 radians so that only one of the 16 predetermined codebooks may be used.

On the other hand, the codebook according to the present invention complements the limitation, and FIG. 12 shows the related characteristics of the codebook.

FIG. 12 illustrates a parametric codebook according to one embodiment of the present invention.

Referring to FIG. 12, long vertical bars 1201 represent code vectors with an arbitrary phase available to construct a codebook.

The phase value of a first code vector constructing a codebook may be selected by a first parameter α.

The phase difference between adjacent code vectors in the codebook may be determined by a second parameter β.

The third parameter γ represents the number of codebook bits and determines the total number of code vectors to construct the codebook. Here, the number of codebook bits represents the number of feedback bits needed when the receiving end feeds back a code vector, which are selected based on the channel condition in the codebook constructed by using the parameters, to the transmitting end (for example, when a UE feeds back the PMI to an eNB).

By changing these parameters, size of a codebook in various forms suitable for a specific channel condition, characteristics of a phase difference between code vectors, and density between code vectors may be controlled.

Here, when specific parameters are used, a codebook employing the specific parameters may be the same as the LTE-A 8Tx codebook; therefore, the codebook according to the present invention may be regarded as a generalized form of the conventional LTE-A codebook.

In what follows, a specific operation procedure and application of the present invention will be described.

FIG. 13 illustrates a method for constructing a code book according to one embodiment of the present invention.

FIG. 13(*a*) illustrates a DL (Downlink) feedback procedure performed with respect to an eNB, and FIG. 13(*b*) illustrates a UL (Uplink) feedback procedure with respect to a UE.

Referring to FIG. 13(*a*), the eNB determines codebook parameters for a receiver (namely a target UE (or UE group)) S1301*a*.

Here, the eNB may determine appropriately codebook parameters based on location information of the receiver and/or incident angle information of a signal transmitted from the receiver (namely uplink channel/signal (for example, an uplink reference signal)).

At this time, the eNB may obtain channel characteristics dependent on the location of the UE by utilizing statistical characteristics and determine the location of the UE by using the channel state information reported from the corresponding UE.

The eNB transmits the determined codebook parameters to the UE S1302*a*.

In other words, the eNB may generate a codebook from the determined codebook parameters and transmit the codebook parameters to the UE.

At this time, the codebook parameters may be transmitted to the UE through an upper layer message (for example, an RRC message or a MAC control element (CE)) or (E)PDCCH.

The UE, which has received the codebook parameter information from the eNB, may generate a codebook by using the codebook parameters.

The codebook generated from the procedure above may be used as a long-term codebook. And if a short-term code vector index is determined according to an instantaneous change of a channel, beamforming may be performed accordingly. For example, after the UE selects one or more code vectors (namely code vectors in proportion to the number of layers) most appropriate to the UE in the generated codebook, the UE may report the PMI that indicates the code vectors (namely the PMI that indicates a precoding matrix constructed by one or more code vectors according to the number of layers) to the eNB, and the eNB may determine a code vector for the corresponding UE with reference to the PMI received from the UE.

Meanwhile, in the S1302*a* step, the eNB may transmit the UE's location information to the UE instead of the codebook parameters. In this case, the UE may determine the final codebook parameters by utilizing the UE's location information received from the eNB and transmit the determined codebook parameters to the eNB.

Referring to FIG. 13(b), the UE determines the codebook parameters most appropriate to the UE itself S1301b.

Here, the UE may obtain statistical characteristics of a channel (for example, characteristics of distribution of phase differences) by utilizing a reference signal (for example, CSI-RS) for each antenna port and determine relevant codebook parameters by utilizing the statistical characteristics.

The UE transmits the determined codebook parameters to the eNB S1302b.

In other words, the UE may generate a codebook based on the determined codebook parameters and transmit the codebook parameters to the eNB.

At this time, the codebook parameters may be delivered to the eNB through an uplink feedback channel. In other words, the UE may transmit the codebook parameters to the eNB by including the codebook parameters in the channel state information (CSI) periodically or non-periodically.

The eNB, which has received the codebook parameters from the UE, may generate a codebook based on the codebook parameters.

The codebook generated from the procedure above may be used as a long-term codebook. And if a short-term code vector index is determined according to an instantaneous change of a channel, beamforming may be performed accordingly. For example, after the UE selects one or more code vectors (namely code vectors in proportion to the number of layers) most appropriate to the UE in the generated codebook, the UE may report the PMI that indicates the code vectors (namely the PMI that indicates a precoding matrix constructed by one or more code vectors according to the number of layers) to the eNB, and the eNB may determine a code vector for the corresponding UE with reference to the PMI received from the UE.

Meanwhile, in the S1302b step, the UE may transmit statistical characteristics of a channel (for example, characteristics of distribution of phase differences) to the eNB instead of the codebook parameters. In this case, the eNB may determine the final codebook parameters by utilizing the received statistical characteristics of a channel and transmit the determined codebook parameters to the UE.

To summarize the example of FIG. 13, the UE of FIG. 13(a) and the eNB of FIG. 13(b) each are an apparatus constructing a codebook by using the received codebook parameters, and the apparatus receiving the codebook parameters may be called collectively a first wireless communication apparatus. Also, the eNB of FIG. 13(a) and the UE of FIG. 13(b) each are an apparatus determining codebook parameters, and the apparatus determining the codebook parameters may be called collectively a second wireless communication apparatus.

Also, differently from the example of FIG. 13, the UE may report, to the eNB, the channel state information (CSI) (for example, RI, CQI, and PMI, etc) measured/derived based on a reference signal (for example, CSI-RS, etc) received from the eNB. And the eNB may determine codebook parameters based on the channel state information and transmit the codebook parameters to the UE (for example, through upper layer signaling or PDCCH). The UE may construct a codebook by using the codebook parameters received from the eNB and transmit the PMI, that indicates a code vector (namely a precoding matrix) selected in the whole or part of the codebook, to the eNB.

In what follows, a specific application of the present invention will be described.

To illustrate an application according to the present invention, the 3D-SCM (Spatial Channel Model) defined in the 3GPP specification is employed.

FIG. 14 illustrates a signal transmission environment in a wireless communication system to which the present invention may be applied.

3D-SCM is a channel model which reflect actual spatial characteristics such as obstacles and three-dimensional position of a UE and is modeled to have a signal transmission environment as shown in FIG. 14.

3D-SCM assumes a multi-path environment, forms channels according to the three-dimensional position, departure and arrival azimuth angle, and zenith angle of a UE, and reflects correlation between physical antenna ports according to disposition of antennas of an eNB.

In FIG. 14, $\phi_{LOS}$ represents LOS (Line of Sight) departure azimuth angle, $\theta_{LOS}$ represents the departure zenith angle, and $\phi_v$ represents the azimuth movement angle of a UE.

In what follows, a method for defining parameters of the 3D-SCM system along with analysis of channel characteristics thereof will be described.

Consider a case where an eNB has a structure based on four 4×4 antennas along the horizontal and the vertical dimension, respectively. In this case, the phase of the i-th (i=0, 1, 2, 3) antenna element in the horizontal and vertical direction respectively is defined as $\phi_i$, and the phase difference between adjacent channels is expressed by $\theta_{i+1}=\phi_{i+1}-\phi_i$.

FIG. 15 shows the distribution of phase difference between the eNB and the adjacent channel of the UE formed according to the change of the azimuth angle with respect to the position of the UE, which is provided to show a statistical characteristic of the channel in order to design a codebook for the horizontal dimension antenna.

FIG. 15 illustrates a phase difference between adjacent channels according to the azimuth angle of a UE according to one embodiment of the present invention.

FIG. 15(a) illustrates the average of phase difference between adjacent channels over the entire cells, FIG. 15(b) illustrates phase difference between adjacent channels at the azimuth angle of 0°, FIG. 15(c) illustrates phase difference between adjacent channels at the azimuth angle of 15°, FIG. 15(d) illustrates phase difference between adjacent channels at the azimuth angle of 30°, FIG. 15(e) illustrates phase difference between adjacent channels at the azimuth angle of 45°, and FIG. 15(f) illustrates phase difference between adjacent channels at the azimuth angle of 60°.

As shown in FIG. 15, it may be seen that distribution of channel phase difference varies according to the location of the UE, and a specific codebook may be utilized, which suits for a specific distribution of the channel phase difference. Each distribution of $\theta_1$, $\theta_2$, and $\theta_3$ has an identical shape at the same azimuth angle, which indicates that the phase of an adjacent channel is increasing or decreasing at equal intervals. The phenomenon described above is caused by correlation between antennas; in this case, a DFT-based codebook may be suitable, where the phase of a code vector is increased at equal intervals.

In order to find appropriate parameters α and β from the distribution function of FIG. 15, a search has been conducted for the azimuth angle of 0°, 15°, 30°, 45°, and 60° with respect to the case of γ=1, 2, and 3, respectively.

FIG. 16 illustrates a relationship between the azimuth angle of a UE and codebook parameters.

FIG. 16(a) shows a search result with respect to the parameter α, and FIG. 16(b) shows a search result with respect to the parameter β. In FIG. 16, the label "search" denotes the α and β value at each azimuth angle.

By using the property that α and β changes proportionally to the change of the azimuth angle, linear modeling is applied to other azimuth angles in addition to the five specific angles (0°, 15°, 30°, 45°, and 60°). In FIG. 16, the first-order function that minimizes the mean square error rate is denoted by "linear approximation", and when the azimuth angle is negative, the first-order function yields symmetric values with respect to the case of positive azimuth angle.

The parameters values of α and β approximated by a first-order function with respect to the azimuth angle θ are shown in Table 6 below.

TABLE 6

| | α [deg.] | β [deg.] |
|---|---|---|
| $\lfloor γ = 1$ | α = sgn(θ)(1.2θ − 19°) | β = sgn(θ)(0.5θ + 53°) |
| $\lfloor γ = 2$ | α = sgn(θ)(0.7θ − 52°) | β = sgn(θ)(0.2θ + 41°) |
| $\lfloor γ = 3$ | α = sgn(θ)(0.6θ − 96°) | β = sgn(θ)(0.1θ + 29°) |

By using Table 6, the UE and the eNB may generate appropriate codebook parameters only through exchange of azimuth angle values.

In what follows, performance evaluation of conventional codebooks along with a codebook according to the present invention will be described with respect to the 3D-SCM system.

VQ-based codebooks, LTE-A 8Tx codebooks, and existing DFT-based codebooks are used for performance comparison, and performance evaluation uses average correlation index.

Correlation between a code vector w and an actual channel h is obtained by w$\bar{h}$, and average correlation μ is given by averaging channel correlations with respect to a plurality of randomly generated channels when a code vector providing the highest correlation is selected among the code vectors $w_1, \ldots, w_Q$ from within the codebook, which is shown in Equation 25.

$$\mu = E[\max_i |w_i \bar{h}|] \quad \text{[Equation 25]}$$

For performance comparison, it is assumed that the average channel size is normalized to the same value.

Performance evaluation is conducted including three codebooks in addition to the VQ and LTE-A 8Tx codebook.

FIG. 17 illustrates a result of performance evaluation in terms of average correlation with respect to a codebook according to the present invention.

FIG. 17(*a*) shows a measurement result of average correlation according to the azimuth angle with respect to the position of a UE, and FIG. 17(*b*) shows a result of averaging the average correlations with respect to the number of bits.

VQ denotes a vector quantization codebook and represents a result based on the Lloyd-Max algorithm. DFT (proposed) denotes a result obtained from the present invention and represents a result about a codebook generated by applying the equations of Table 6. DFT (greedy selection) represents a result by using a code vector selected by applying a greedy algorithm according to the channel characteristics from a 4×64 DFT matrix, the corresponding algorithm of which may be generated through the flow diagram of FIG. 18 below.

The LTE-A 8TX, Uniform DFT, and Modified DFT are codebooks generated by employing the DFT matrix, respectively. The LTE-A 8TX codebook may be generated from Equation 25 described above. In the case of Uniform DFT, it is a URA (Uniform Rectangular Array) codebook based on the Kronecker product, and a method for generating the codebook is the same as the one well-known in the field. Also, in the case of Modified DFT, orthogonality between code vectors is introduced by adding periodicity to the DFT matrix, and a specific method for generating a codebook is the same as the one well-known in the field. As a result of performance evaluation, the codebook according to the present invention shows superior performance compared to those of the conventional Uniform DFT and Modified DFT codebook. When compared with VQ-based and greedy selection-based codebooks, the codebook according to the present invention shows to be simpler in terms of complexity and provides similar performance in terms of average correlation. It may be seen that the DFT codebook according to the present invention is superior in terms of both complexity and performance.

FIG. 18 illustrates a greedy selection algorithm.

Referring to FIG. 18, the algorithm generates an M×L DFT matrix $W_{DFT}$ S1801. k is determined as a number of codebook bits.

The correlation index between the i-th code vector candidate and the j-th channel, $\alpha(i,j) = |\bar{h}_j w_i|$, is calculated S1802.

The total sum of correlation index of the i-th code vector candidate, $\alpha(i) = \Sigma_j |\bar{h}_j w_i|$, is calculated S1803.

First, $m = \text{argmax}_i (\alpha(i))$ is calculated with t=0, and the m-th code vector candidate is determined as the t-th code vector candidate S1804.

The value of t is increased by 1 (t=t+1) and it is checked whether t is larger than $2^k$ S1805.

If it is determined from the S1805 step that t is larger than $2^k$, the codebook generation process is terminated.

Meanwhile, if it is determined from the result of the S1805 step that t is smaller than or equal to $2^k$, the correlation index $\alpha(m, j) = |\bar{h}_j w_m|$ of the t-th code vector $w_m$ is compared with the correlation indices $\alpha(i,j) = |\bar{h}_j w_i|$ of all of the code vector candidates S1806.

It is determined whether α(m, j) is smaller than α(i, j) S1807.

If it is determined from the determination result of the S1807 step that α(m, j) is smaller than α(i, j), the S1804 step is performed.

Meanwhile, if it is determined from the result of the S1807 step that α(m, j) is larger than or equal to α(i, j), α(i, j) is replaced with α(m, j) S1808, and the S1804 step is performed.

The Device to Which the Present Invention May be Applied in General

FIG. 19 illustrates a block diagram of a wireless communication apparatus according to one embodiment of the present invention.

Referring to FIG. 19, a wireless communication system includes an eNB 1910 and a plurality of UEs 1920 located within the range of the eNB 1910.

The eNB 1910 includes a processor 1911, memory 1912, and RF (Radio Frequency) unit 1913. The processor 1911 implements the functions, processes and/or methods described with reference to FIGS. 1 to 18. Layers of a wireless interface protocol may be implemented by the processor 1911. The memory 1912, being connected to the processor 1911, stores various kinds of information to operate the processor 1911. The RF unit 1913, being connected to the processor 1911, transmits and/or receives a radio signal.

The UE 1920 includes a processor 1921, memory 1922, and RF unit 1923. The processor 1921 implements the functions, processes and/or methods described with reference to FIGS. 1 to 18. Layers of a wireless interface protocol may be implemented by the processor 1921. The memory 1922, being connected to the processor 1921, stores various kinds of information to operate the processor 1921. The RF unit 1923, being connected to the processor 1921, transmits and/or receives a radio signal.

The memory 1912, 1922 may be installed inside or outside the processor 1911, 1921 and may be connected to the processor 3511, 3521 via various well-known means. Also, the eNB 1910 and/or the UE 1920 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

This document discloses a method for constructing a codebook in a multiple-antenna wireless communication system in a wireless communication system with examples based on the 3GPP LTE/LTE-A system; however, the present invention may be applied to various other types of wireless communication systems in addition to the 3GPP LTE/LTE-A system.

The invention claimed is:

1. A method for constructing, by a user equipment (UE), a codebook in a multiple-antenna wireless communication system, the method comprising:
receiving parameters for constructing the codebook from an Evolved Node B (eNB); and
constructing the codebook by using the parameters for constructing the codebook,
wherein the parameters for constructing the codebook comprises a phase value ($\alpha$) of a first code vector forming the codebook, a phase difference ($\beta$) between code vectors adjacent to each other within the codebook, and a number of bits ($\gamma$) required when feeding back a code vector selected in the codebook,
wherein the parameters for constructing the codebook are determined from a distribution of channel phase differences measured by using a CSI-RS (Channel State Information-Reference Signal) for each antenna port transmitted from the eNB, and
wherein an azimuth angle of the UE, the phase value ($\alpha$) of the first code vector, and the phase difference ($\beta$) between adjacent code vectors in the codebook are proportional to each other.

2. The method of claim 1, wherein the codebook is constructed by using a mathematical equation below, $$W[N \times M] = \frac{1}{\sqrt{N}} \begin{bmatrix} 1 & 1 & 1 & \cdots & 1 \\ e^{j\alpha} & e^{j(\alpha+\beta)} & e^{j(\alpha+2\beta)} & \cdots & e^{j(\alpha+(M-1)\beta)} \\ e^{2j\alpha} & e^{2j(\alpha+\beta)} & e^{2j(\alpha+2\beta)} & \cdots & e^{2j(\alpha+(M-1)\beta)} \\ \vdots & \vdots & \vdots & \ddots & \vdots \\ e^{(N-1)j\alpha} & e^{(N-1)j(\alpha+\beta)} & e^{(N-1)j(\alpha+2\beta)} & \cdots & e^{2j(\alpha+(M-1)\beta)} \end{bmatrix},$$ [Equation]

where N represents the number of transmission antennas, and M represents the total number of code vectors forming the codebook, which is determined by $2\gamma$.

3. The method of claim 1, wherein the parameters for constructing the codebook are determined from location information of the UE and/or incident angle information of an uplink signal transmitted from the UE.

4. The method of claim 1, wherein the phase value ($\alpha$) of the first code vector and the phase difference ($\beta$) between adjacent code vectors in the codebook are determined from the azimuth angle of the UE.

5. The method of claim 1, wherein a precoding matrix indicator (PMI) indicating a precoding matrix formed by one or more code vectors selected from the codebook is reported to the eNB.

6. A user equipment (UE) constructing a codebook in a multiple-antenna wireless communication system, the UE comprising:
a transceiver transmitting and receiving a radio signal; and
a processor controlling the transceiver, wherein the processor is configured to:
receive parameters for constructing the codebook from an Evolved Node B (eNB, and
construct the codebook by using the parameters for constructing the codebook,
wherein the parameters for constructing the codebook comprise a phase value ($\alpha$) of a first code vector forming the codebook, a phase difference ($\beta$) between code vectors adjacent to each other within the codebook, and a number of bits ($\gamma$) required when feeding back a code vector selected in the codebook,
wherein the parameters for constructing the codebook are determined from a distribution of channel phase differences measured by using a CSI-RS (Channel State Information-Reference Signal) for each antenna port transmitted from the eNB, and
wherein an azimuth angle of the UE, the phase value ($\alpha$) of the first code vector, and the phase difference ($\beta$) between adjacent code vectors in the codebook are proportional to each other.

* * * * *